(12) United States Patent
Nagata

(10) Patent No.: US 9,071,711 B2
(45) Date of Patent: Jun. 30, 2015

(54) IMAGE PROCESSING SYSTEM, IMAGE PROCESSING METHOD, AND STORAGE MEDIUM

(75) Inventor: Yoshinori Nagata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/359,144

(22) PCT Filed: Aug. 8, 2012

(86) PCT No.: PCT/JP2012/070277
§ 371 (c)(1),
(2), (4) Date: May 19, 2014

(87) PCT Pub. No.: WO2013/077037
PCT Pub. Date: May 30, 2013

(65) Prior Publication Data
US 2014/0307293 A1    Oct. 16, 2014

(30) Foreign Application Priority Data
Nov. 24, 2011    (JP) .................................. 2011-256691

(51) Int. Cl.
*G06F 15/00*       (2006.01)
*H04N 1/00*        (2006.01)
*G06F 3/0481*      (2013.01)
*G06F 3/12*        (2006.01)

(52) U.S. Cl.
CPC ............. *H04N 1/00514* (2013.01); *H04N 1/00* (2013.01); *G06F 3/04817* (2013.01); *G06F 3/1204* (2013.01); *G06F 3/1257* (2013.01); *G06F 3/1285* (2013.01); *H04N 1/00411* (2013.01)

(58) Field of Classification Search
CPC ..................................................... G06F 3/1204
USPC ........................................................ 358/1.15
See application file for complete search history.

(56) References Cited

U.S. PATENT DOCUMENTS

| 6,848,081 B1 | 1/2005 | Yoda et al. |
| 2005/0076310 A1 | 4/2005 | Tada |
| 2005/0193340 A1* | 9/2005 | Amburgey et al. ........... 715/709 |
| 2006/0238786 A1 | 10/2006 | Sakura et al. |

FOREIGN PATENT DOCUMENTS

| JP | 2000-354124 A | 12/2000 |
| JP | 2002-244855 A | 8/2002 |
| JP | 2005-064817 A | 3/2005 |
| JP | 2005-108066 A | 4/2005 |

(Continued)

OTHER PUBLICATIONS

Official Communication issued in International Patent Application No. PCT/JP2012/070277, mailed on Oct. 9, 2012.

*Primary Examiner* — Saeid Ebrahimi Dehkord
(74) *Attorney, Agent, or Firm* — Keating & Bennett, LLP

(57) ABSTRACT

In an image processing system, a control device (11) of a first host PC (1) controls (i) a storage device (12) of the first host PC (1) to store an icon registered on the first host PC (1), (ii) the icon to be registered on a multifunction peripheral (5), and (iii) the icon to be transmitted to a first client PC (3). In the image processing system, a control device (31) of the first client PC (3) controls a storage device (32) of the first client PC (3) to store the icon received from the first host PC (1), and controls a display device (35) of the first client PC (3) to display the icon.

7 Claims, 26 Drawing Sheets

(56) References Cited

FOREIGN PATENT DOCUMENTS

| JP | 2006-309352 A | 11/2006 |
| JP | 2009-181401 A | 8/2009 |
| JP | 2009-282918 A | 12/2009 |
| JP | 2011-060274 A | 3/2011 |

* cited by examiner

FIG. 2

(LOGIN INFORMATION)

| THE NUMBER N OF USERS |
|---|
| CLIENT IDENTIFIER 1 |
| USER IDENTIFIER 1 |
| USER NAME 1 |
| PASSWORD 1 |
| CLIENT IDENTIFIER 2 |
| USER IDENTIFIER 2 |
| USER NAME 2 |
| PASSWORD 2 |
| . . . |
| CLIENT IDENTIFIER N |
| USER IDENTIFIER N |
| USER NAME N |
| PASSWORD N |

- INDIVIDUAL LOGIN INFORMATION 1
- INDIVIDUAL LOGIN INFORMATION 2
- INDIVIDUAL LOGIN INFORMATION N

FIG. 3

(LICENSE KEY INFORMATION)

| THE NUMBER N OF LICENSE KEYS |
|---|
| LICENSE KEY 1 |
| LICENSE KEY 2 |
| . . . |
| LICENSE KEY N |

FIG. 26

PLEASE SPECIFY SCANNING CONDITION

| TARGET TO BE SCANNED | SCANNING CONDITION | PC PROCESS |

| COLOR MODE | FULL COLOR |
| PAPER SIZE | A4 |
| RESOLUTION | 300DPI |
| DOUBLE-SIDE SCANNING | YES |
| CONCENTRATION | NORMAL |

↑ ↓ — 204

EXECUTION — 209

FIG. 27

PLEASE SPECIFY SCANNING CONDITION

DETAILS OF PROFILE HAS BEEN CHANGED

SAVE CHANGED PROFILE?

210 — NO
211 — OVERWRITING SAVE
212 — NEWLY SAVING

↑ ↓ — 204

EXECUTION — 209

FIG. 28

(PC PROCESSING CONDITION)

| SKEW CORRECTION ON/OFF |
| --- |
| SKEW CORRECTION PARAMETER |
| CHARACTER RECOGNITION ON/OFF |
| CHARACTER RECOGNITION PARAMETER |
| IMAGE HIGH COMPRESSION ON/OFF |
| IMAGE HIGH COMPRESSION PARAMETER |
| . . . |
| APPLICATION STARTUP ON/OFF |
| APPLICATION STARTUP PARAMETER |

FIG. 30

| USER IDENTIFIER | MULTIFUNCTION PERIPHERAL IDENTIFICATION INFORMATION | ICON ID 1 | THE ORDER IN WHICH ICON IDS ARE ARRANGED 1 | ICON ID 2 | THE ORDER IN WHICH ICON IDS ARE ARRANGED 2 | ... |
|---|---|---|---|---|---|---|
| yyyzzzxxx0123 | 10.123.123.zz | ico100 | 1 | ico101 | 2 | ... |
| yyyzzzxxx0123 | 10.222.333.xx | ico100 | 2 | ico101 | 1 | ... |

...

| abcabc9999 | 10.123.123.zz | ico200 | 1 | ico201 | 2 | ... |
| abcabc9999 | 10.222.333.xx | ico200 | 2 | ico201 | 1 | ... |

IMAGE PROCESSING SYSTEM, IMAGE PROCESSING METHOD, AND STORAGE MEDIUM

TECHNICAL FIELD

The present invention relates to (i) an image processing system in which an icon associated with an operation of an image processing apparatus is used, (ii) an image processing method and (iii) a storage medium.

BACKGROUND ART

Conventionally, there has been proposed a multifunction peripheral which is configured such that a user can create, in accordance with a request of the user, an operation button such as an icon on a touch panel which serves as an operation panel. For example, Patent Literature 1 discloses a multifunction peripheral, also serving as a scanner, which is configured to (i) have a transfer system for transferring, to another device, an image scanned by the multifunction peripheral, and (ii) allow a user to register, by use of a tool of the transfer system, an icon to be displayed on an operation panel of the multifunction peripheral. By conducting an operation with respect to the registered icon, a user creates a profile such as a scan profile, and instructs the multifunction peripheral to start a process.

The configuration allows a user to (i) register a desired icon on the multifunction peripheral and (ii) easily find a target icon on the operation panel of the multifunction peripheral. Consequently, the user can shorten a time period during which the user operates the multifunction peripheral.

CITATION LIST

Patent Literature
Patent Literature 1
Japanese Patent Application Publication, Tokukai, No. 2000-354124 A (Publication Date: Dec. 19, 2000)

SUMMARY OF INVENTION

Technical Problem

However, according to the conventional configuration, it is necessary to create an icon for each multifunction peripheral. Therefore, for example, in a case where a user selects and uses, in accordance with a situation, one(s) of a plurality of multifunction peripherals which are provided in one office, the user should create an icon for each of the plurality of multifunction peripherals. This requires the user to conduct a troublesome operation of creating an icon for each of the plurality of multifunction peripherals.

In order to solve the problem, an object of the present invention is to provide (i) an image processing system in which, in a case where a user uses as appropriate a plurality of image processing apparatuses, the user can easily create an icon for each of the plurality of image processing apparatuses, (ii) an image processing method and (iii) a storage medium.

Solution to Problem

In order to attain the object, an image processing system of the preset invention is configured to include: a client device; a host device; and an image processing apparatus, an icon, associated with operation setting information, being registered on the image processing apparatus, a display device of the image processing apparatus displaying the icon in response to a request to display the icon, and the image processing apparatus operating in accordance with an operation condition indicated by operation setting information associated with a selected icon, the client device including a storage device and a control section, the control section of the client device controlling (i) the storage device of the client device to store a first icon registered on the client device and (ii) the first icon to be transmitted to the host device, the host device including a storage device and a control section, and the control section of the host device controlling (i) the storage device of the host device to store the first icon received from the client device and (ii) the first icon to be registered on the image processing apparatus.

An image processing method of the present invention is configured so that an icon associated with operation setting information is registered on an image processing apparatus, a display device of the image processing apparatus displays the icon in response to a request to display the icon, and the image processing apparatus operates in accordance with an operation condition indicated by operation setting information associated with a selected icon, the image processing method including the steps of: causing a storage device of a client device to store an icon registered on the client device, and transmitting the icon to a host device; and causing a storage device of the host device to store the icon received from the client device, and causing the icon to be registered on the image processing apparatus.

According to the configuration, the control section of the client device controls (i) the storage device of the client device to store the first icon registered on the client device and (ii) the first icon to be transmitted to the host device. The control section of the host device controls (i) the storage device of the host device to store the first icon received from the client device and (ii) the first icon to be registered on the image processing apparatus. The display device of the image processing apparatus displays the first icon thus registered, in response to a request to display the first icon. The image processing apparatus operates in accordance with an operation condition indicated by operation setting information associated with a selected icon.

Therefore, for example, even in a case where there are a plurality of image processing apparatuses in one office, a user can use a desired icon in any one of the plurality of image processing apparatuses by registering in advance the desired icon on the client device such that the desired icon is associated with operation setting information. That is, the user can easily conduct a setting operation of the desired icon without conducting any complicated setting operation so as to use the desired icon in each of the plurality of image processing apparatuses.

Further, according to the configuration, the host device can use as appropriate the first icon registered on the client device.

Advantageous Effects of Invention

According to the present invention, for example, even in a case where there are a plurality of image processing apparatuses in one office, a user can use a desired icon in any one of the plurality of image processing apparatuses by registering in advance the desired icon on a client device such that the desired icon is associated with operation setting information. That is, the user can easily conduct a setting operation of the desired icon without conducting any complicated setting operation so as to use the desired icon in each of the plurality of image processing apparatuses. Further, according to the present invention, a host device can use as appropriate an icon registered on a client device.

BRIEF DESCRIPTION OF DRAWINGS

FIG. 2 is an explanatory view schematically illustrating a data structure of login information to be stored in each storage device of a first host PC, a second host PC, a first client PC, and a second client PC which are illustrated in FIG. 1.

FIG. 3 is an explanatory view schematically illustrating a data structure of license key information to be stored in the respective storage devices of the first and second host PCs which are illustrated in FIG. 1.

FIG. 26 is an explanatory view illustrating a profile details displaying screen to be displayed in S31 of FIG. 21.

FIG. 27 is an explanatory view illustrating a profile saving confirmation screen to be displayed in S43 of FIG. 22.

FIG. 28 is an explanatory view schematically illustrating a data structure of information on a PC processing condition contained in the profile information illustrated in FIG. 4.

FIG. 30 shows a management table which shows (i) icon IDs of respective profile icons for each multifunction peripheral and (ii) the order in which the icon IDs are arranged. The management table is stored in the storage device of the first host PC illustrated in FIG. 1.

DESCRIPTION OF EMBODIMENTS

The following description will discuss an embodiment of the present invention with reference to the drawings.

(System Configuration)

Figure 1:
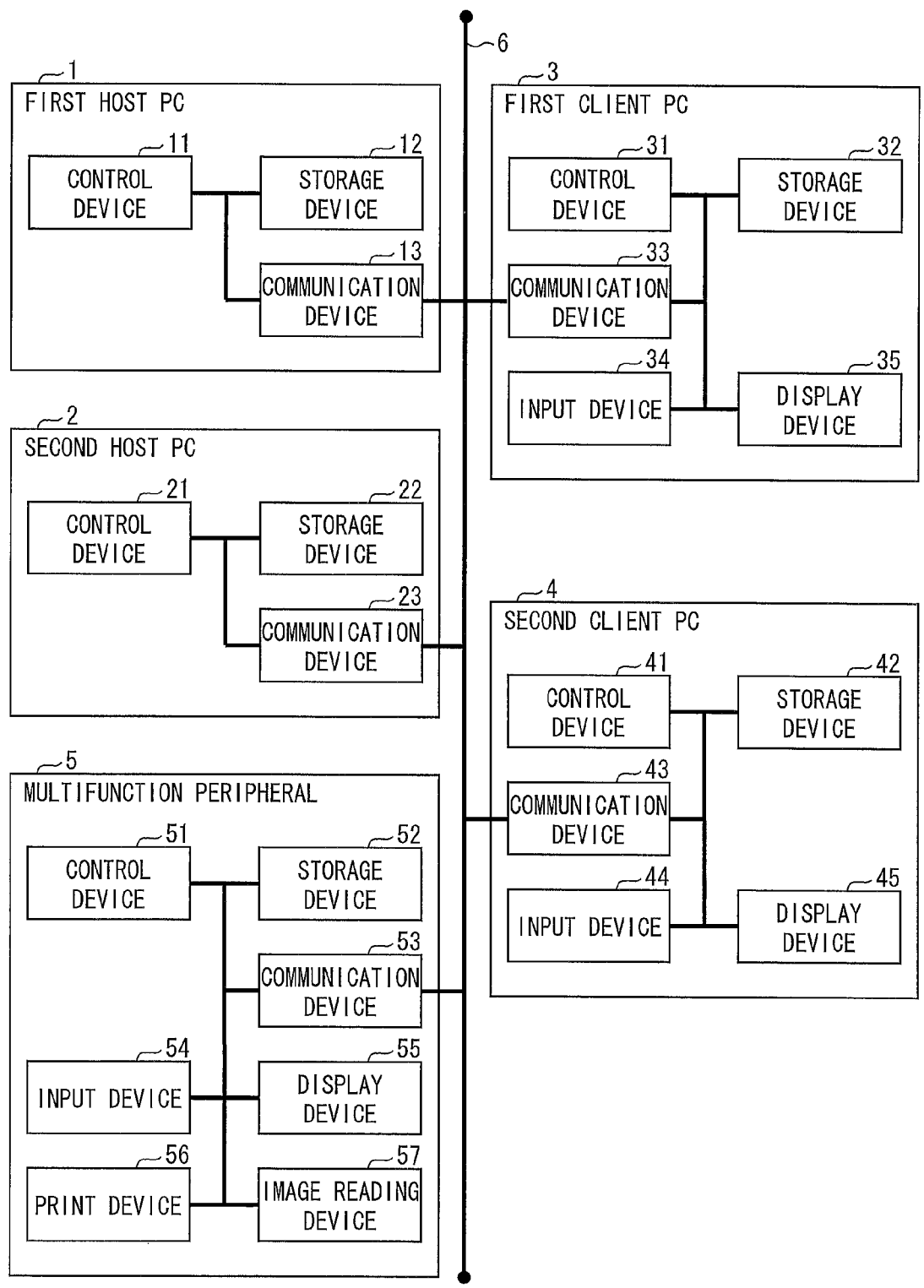
FIG. 1 is a block diagram illustrating a configuration of an image processing system in accordance with an embodiment of the present invention.

FIG. 1 is a block diagram illustrating a configuration of an image processing system in accordance with the embodiment of the present invention. Note that a personal computer is hereinafter abbreviated to a PC.

As illustrated in FIG. 1, the information processing system includes a first host PC 1 (host device), a second host PC 2 (host device), a first client PC 3 (client device), a second client PC 4 (client device), and a multifunction peripheral 5 (image processing apparatus). The first host PC 1, the second host PC 2, the first client PC 3, the second client PC 4, and the multifunction peripheral 5 are connected to one another via a network 6.

The first host PC 1 includes a control device 11 (control section), a storage device 12 (storage device), and a communication device 13. Similarly, the second host PC 2 includes a control device 21 (control section), a storage device 22 (storage device), and a communication device 23.

The first client PC 3 includes a control device 31, a storage device 32 (storage device), a communication device 33, an input device 34, and a display device 35 (display device).

Similarly, the second client PC 4 includes a control device 41, a storage device 42 (storage device), a communication device 43, an input device 44, and a display device 45 (display device).

The multifunction peripheral 5 includes a control device 51, a storage device 52, a communication device 53, an input device 54, a display device 55 (display device of the image processing apparatus), a print device 56, and an image reading device 57.

Each of the control devices 11 and 21 of the respective first and second host PCs 1 and 2 includes a CPU. Each of the storage devices 12 and 22 includes a hard disc drive and a RAM. Each of the communication devices 13 and 23 includes a LAN card, and is connected to the network 6.

Upon reception of a request from the first client PC 3, the second client PC 4 or the multifunction peripheral 5, each of the first host PC 1 and the second host PC 2 provides various user interfaces via which display is carried out by the display device 35, 45 or 55, respectively. This necessitates each of the first and second host PCs 1 and 2 to hold or create pieces of data to be displayed via the respective user interfaces.

The control devices 31 and 41 of the first and second client PCs 3 and 4 include respective CPUs. Each of the storage devices 32 and 42 includes a hard disc drive and a RAM. Each of the communication devices 33 and 43 includes a LAN card, and is connected to the network 6. Each of the input devices 34 and 44 includes a keyboard and a mouse. Each of the display devices 35 and 45 includes a liquid crystal display.

The control device 51 of the multifunction peripheral 5 includes a CPU. The storage device 52 includes a hard disc drive and a RAM. The communication device 53 includes a LAN card, and is connected to the network 6. The input device 54 includes a numeric keypad and a touch panel. The display device 55 includes, for example, a liquid crystal display. The display device 55 is provided in an operation panel of the multifunction peripheral 5. The display device 55 of the present embodiment includes a touch panel. The print device 56 prints image data onto paper. The image reading device 57 reads information on paper, and creates image data based on the information.

Note here that the network 6 does not necessarily need to be connected with the communication devices 13, 23, 33, 43 and 53, via a wired line such as a LAN cable, and can be alternatively connected with the communication devices 13, 23, 33, 43 and 53, via wireless LAN. Furthermore, some devices can be on the Internet via fire wall.

(Login Information)

FIG. 2 is an explanatory view schematically illustrating a data structure of login information to be stored in each of (i) the storage devices 12 and 22 of the respective first and second host PCs 1 and 2 and (ii) storage devices 32 and 42 of the respective first and second client PCs 3 and 4 (see FIG. 1). FIG. 3 is an explanatory view schematically illustrating a data structure of license key information to be stored in the storage devices 12 and 22 of the respective first and second host PCs 1 and 2 which are illustrated in FIG. 1.

As illustrated in FIG. 2, the login information contains the number N of users contained in the login information, and as many pieces of individual login information (pieces of individual login information 1 through N). Each of the pieces of individual login information contains (i) a client identifier for identifying the first client PC 3 or the second client PC 4 corresponding to the each of the piece of individual login information, (ii) a user identifier for identifying a user, (iii) a user name, and (iv) a password.

(License Key Information)

As illustrated in FIG. 3, the license key information contains the number N of license keys and as many license keys. Each license key is a character string for identifying a license given to a corresponding one of the first and second client PCs 3 and 4.

The pieces of individual login information of the login information of FIG. 2 are related to the respective license keys of the license key information of FIG. 3. Specifically, individual login information 1 corresponds to a license key 1, individual login information 2 corresponds to a license key 2, . . . , and individual login information N corresponds to a license key N.

(Profile Information)

Figure 4:
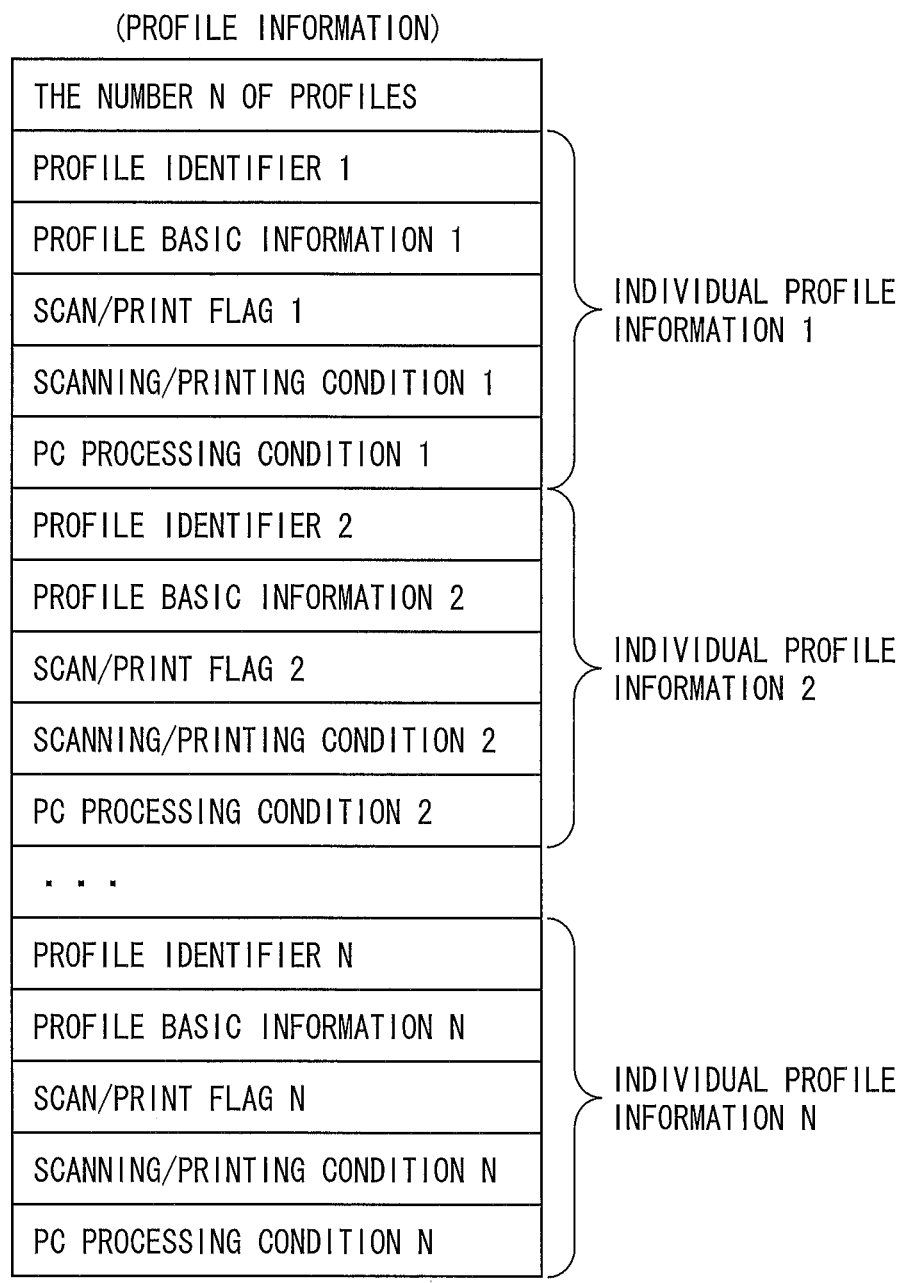
FIG. 4 is an explanatory view schematically illustrating a data structure of profile information to be stored in each of (i) the storage devices of the respective first and second host PCs and (ii) the storage devices of the respective first and second client PCs (see FIG. 1).
Figure 5:
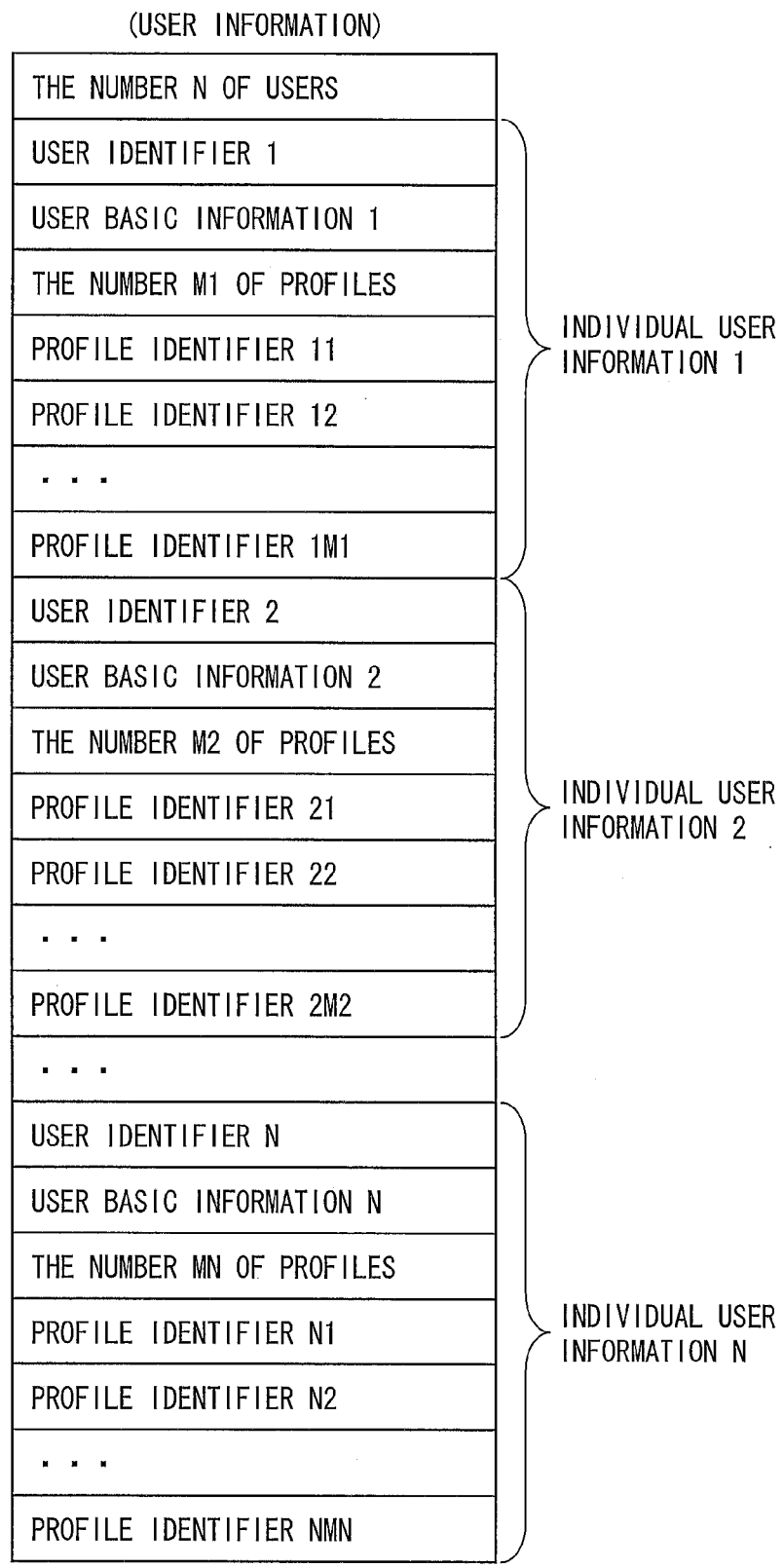
FIG. 5 is an explanatory view schematically illustrating a data structure of user information to be stored in each of (i) the storage devices of the respective first and second host PCs and (ii) the storage devices of the respective first and second client PCs (see FIG. 1).

FIG. 4 is an explanatory view schematically illustrating a data structure of profile information to be stored in each of (i) the storage devices 12 and 22 of the respective first and second host PCs 1 and 2 and (ii) the storage devices 32 and 42 of the respective first and second client PCs 3 and 4 (see FIG. 1). FIG. 5 is an explanatory view schematically illustrating a data structure of user information to be stored in each of (i) the storage devices 12 and 22 of the respective first and second host PCs 1 and 2 and (ii) the storage devices 32 and 42 of the respective first and second client PCs 3 and 4 (see FIG. 1). The profile information and the user information are created by the first host PC 1, the second host PC 2, the first client PC 3, or the second client PC 4. The profile information contains operation setting information of the multifunction peripheral 5.

(Icon Information)

Figure 6:
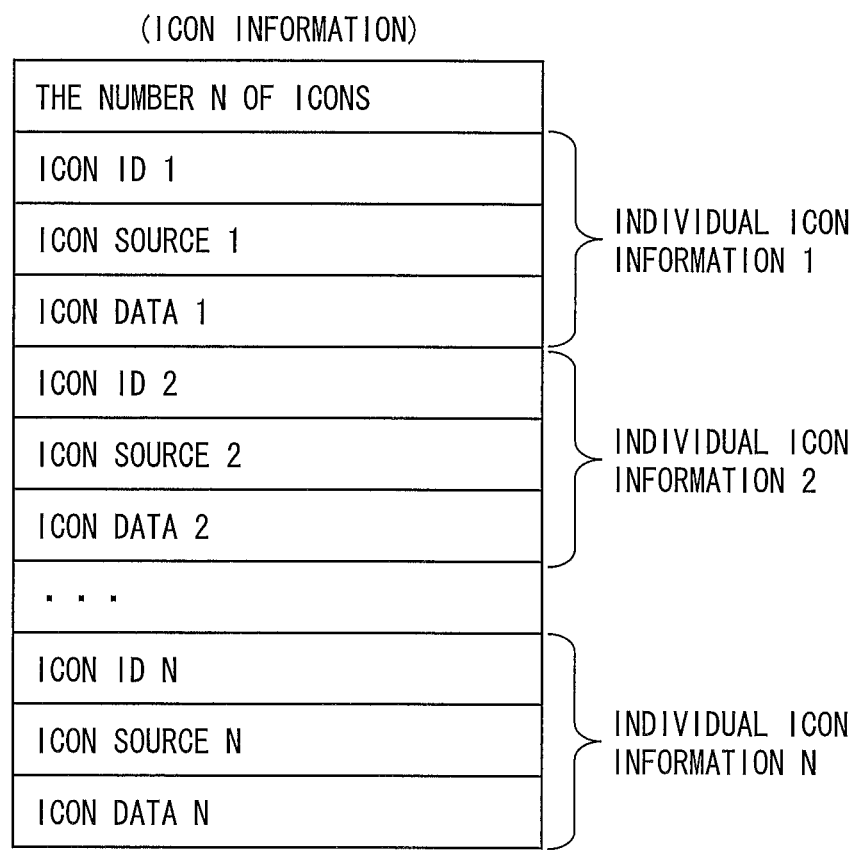
FIG. 6 is an explanatory view schematically illustrating a data structure of icon information to be stored in each of (i) the storage devices of the respective first and second host PCs and (ii) the storage devices of the respective first and second client PCs (see FIG. 1).

FIG. 6 is an explanatory view schematically illustrating a data structure of icon information to be stored in each of (i) the storage devices 12 and 22 of the respective first and second host PCs 1 and 2 and (ii) the storage devices 32 and 42 of the respective first and second client PCs 3 and 4 (see FIG. 1).

The icon information contains the number N of icons contained in the icon information, and as many pieces of individual icon information (pieces of individual icon information 1 through N). Each of the pieces of individual login information contains an icon ID, an icon source, and a piece of icon data.

Each icon ID identifies a corresponding icon. Each icon source is information indicative of where a corresponding icon has been registered. Specifically, the each icon source corresponds to one of (i) a host ID for identifying a corresponding one of the first host PC 1 and the second host PC 2, (ii) a client ID for identifying a corresponding one of the first client PC3 and the second client PC 4, and (iii) a user ID for identifying a corresponding user. Each piece of icon data is image data of a corresponding icon.

Note that a profile created for each of users in the image processing system of the present embodiment includes (i) a scan profile to be used when the image reading device 57 of the multifunction peripheral 5 scans and (ii) a print profile to be used when the print device 56 prints. The scan profile and the print profile are stored in each of (i) the storage devices 12 and 22 of the respective first and second host PCs 1 and 2 and (ii) the storage devices 32 and 42 of the respective first and second client PCs 3 and 4.

(Relationship Between Profile Information and User Information)

The profile information of FIG. 4 is related to the user information of FIG. 5. Specifically, pieces of profile information of FIG. 4 are provided for respective pieces of individual user information 1 through N of the user information of FIG. 5. Each of the pieces of individual user information is provided for a corresponding one of the users. A profile identifier 11 of the individual user information 1 of FIG. 5 corresponds to a profile identifier 1 of individual profile information 1 of FIG. 4, a profile identifier 12 of the individual user information 1 of FIG. 5 corresponds to a profile identifier 2 of individual profile information 2 of FIG. 4, . . . , and a profile identifier 1M1 of the individual user information N of FIG. 5 corresponds to a profile identifier N of individual profile information N of FIG. 4.

As illustrated in FIG. 4, the profile information contains (i) information indicative of the number N of profiles (the number of pieces of individual profile information) contained in the profile information and (ii) as many pieces of individual profile information 1 through N.

Each of the pieces of individual profile information 1 through N contains a profile identifier, a profile name, a piece of profile basic information, a scan/print flag, a scanning/printing condition, and a PC process condition.

Each profile identifier distinguishes a corresponding one of pieces of individual profile information which contains the each profile identifier from the others of the pieces of individual profile information so as to identify the corresponding one of the pieces of individual profile information. Each piece of profile basic information is information such as profile icon information determined for a corresponding profile (a corresponding one of the pieces of individual profile information). Each scan/print flag is a flag for determining that a profile indicated by a corresponding one of the pieces of individual profile information is either a scan profile or a print profile. Each scanning/printing condition is indicative of (i) a condition (scanning condition) used when the image reading device of the multifunction peripheral 5 scans or (ii) a condition (printing condition) used when the print device 56 prints, depending on whether a profile indicated by a corresponding one of the pieces of individual profile information is a scan profile or a print profile, respectively. The PC process condition is indicative of a condition under which the first host PC 1, the second host PC 2, the first client PC 3 or the second client PC 4 conducts a PC process.

As illustrated in FIG. 5, the user information contains (i) information indicative of the number N of users (the number of pieces of individual user information) contained in the user information and (ii) as many pieces of individual user information 1 through N. Each of the pieces of individual user information 1 through N contains (i) a user identifier, (ii) a user name, (iii) a piece of user basic information, (iv) information indicative of the number of profiles M1 through MN (the number of profiles which a corresponding user has) contained in the each of the pieces of individual user information 1 through N, and (v) profile identifiers.

Each user identifier distinguishes a corresponding one of the pieces of individual user information which contains the each user identifier from the others of the pieces of individual user information so as to identify the corresponding one of the pieces of individual user information. Each piece of user basic information is information such as user icon information determined for a corresponding user (a corresponding one of the pieces of individual user information). Each of the pieces of individual user information 1 through N contains the profile identifiers whose number is equal to the number of profiles M1 through MN.

The following description will discuss an operation of the above-configured image processing system of the present embodiment. Specifically, the following description will mainly discuss how operations are conducted between the first client PC 3 and the first host PC 1. Note that the operations (described below) between a client PC and a host PC can be (i) operations between the first host PC 1 and the first client PC 3 or the second client 4, or (ii) operations between the second host PC 2 and the first client PC 3 or the second client PC 4.

(Operations Conducted when Login Information is Registered)

Figure 7:
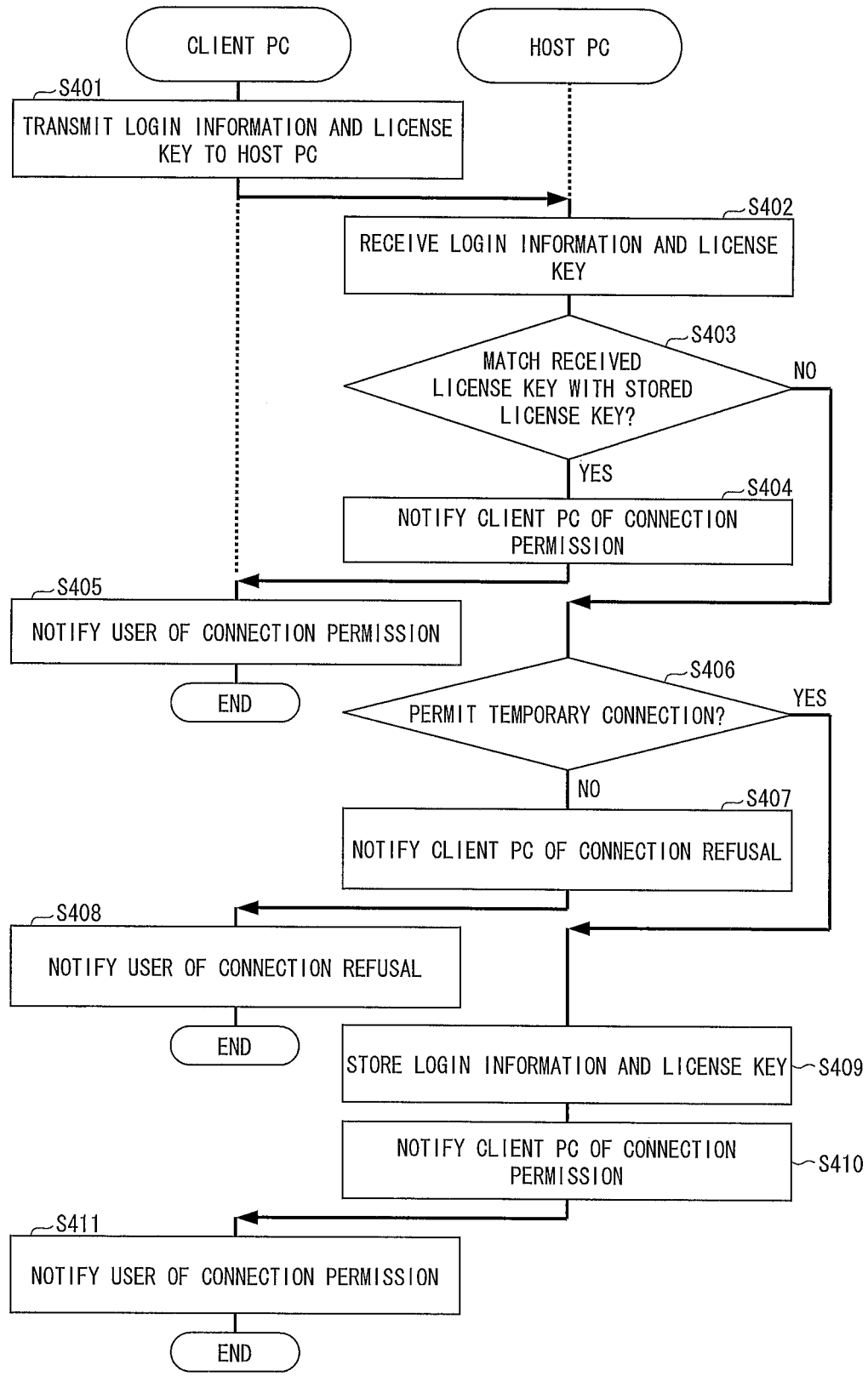
FIG. 7 is a flowchart illustrating operations conducted in a case where login information is registered on the image processing system illustrated in FIG. 1.

FIG. 7 is a flowchart illustrating operations conducted in a case where login information is registered on the image processing system illustrated in FIG. 1. The operations include a process carried out in a case where an unregistered client PC is connected to a host PC.

As illustrated in FIG. 7, when the first client PC 3 is connected to the first host PC 1 via the network 6, the control device 31 of the first client PC 3 transmits, to the first host PC 1 via the communication device 33 and the network 6, (i) login information stored in the storage device 32 and (ii) a license key, stored in the storage device 32, which has been assigned to the first client PC 3 (S401).

The control device 11 of the first host PC 1 receives the login information (client identification information) and the license key from the first client PC 3 via the network 6 and the communication device 33 (S402).

The control device 11 of the first host PC 1 determines whether or not the received license key matches any one of the license keys of the license key information stored in the storage device 12 (S403). In a case where the control device 11 of the first host PC 1 determines that the received license key matches any one of the license keys, the control device 11 of the first host PC 1 determines that a connection request from the first client PC 3 is not a temporary connection request, and notifies the first client PC 3 of connection permission via the communication device 13 and the network 6 (S404).

The control device 31 of the first client PC 3 receives the connection permission from the first host PC 1 via the network 6 and the communication device 33. In response to the connection permission, the control device 31 of the first client PC 3 notifies a user of information on the connection permission, for example, by controlling the display device 35 to display the information (S405). Thus, the control device 31 of the first client PC 3 ends a process.

In contrast, in a case where the control device 11 of the first host PC 1 determines in S403 that the received license key does not match any one of the license keys, the control device 11 of the first host PC 1 determines that the connection request from the first client PC 3 is the temporary connection request, and further determines whether or not a temporary connection is determined to be permitted (S406). In a case where the control device 11 of the first host PC 1 determines in S406 that the temporary connection is not determined to be permitted, the control device 11 of the first host PC 1 notifies the first client PC 3 of a connection refusal via the communication device 13 and the network 6 (S407). Note that whether to permit a temporary connection is determined in advance with respect to the first host PC 1 by, for example, a manager of the first host PC 1.

The control device 31 of the first client PC 3 receives the connection refusal from the first host PC 1 via the network 6 and the communication device 33. In response to the connection refusal, the control device 31 of the first client PC 3 notifies a user of information on the connection refusal (S408). Thus, the control device 31 of the first client PC 3 ends a process.

In contrast, in a case where the control device 11 of the first host PC 1 determines in S406 that the temporary connection is determined to be permitted, the control device 11 of the first host PC 1 controls the storage device 12 to store the login information and the license key which have been transmitted from the first client PC 3 (S409). Subsequently, the control device 11 of the first host PC 1 notifies the first client PC 3 of connection permission via the communication device 13 and the network 6 (S410).

The control device 31 of the first client PC 3 receives the connection permission from the first host PC 1 via the network 6 and the communication device 33. In response to the connection permission, the control device 31 of the first client PC 3 notifies a user of information on the connection permission (S411). Thus, the control device 31 of the first client PC 3 ends a process.

(Operation Conducted after Client PC is Connected to Host PC)

Figure 8:
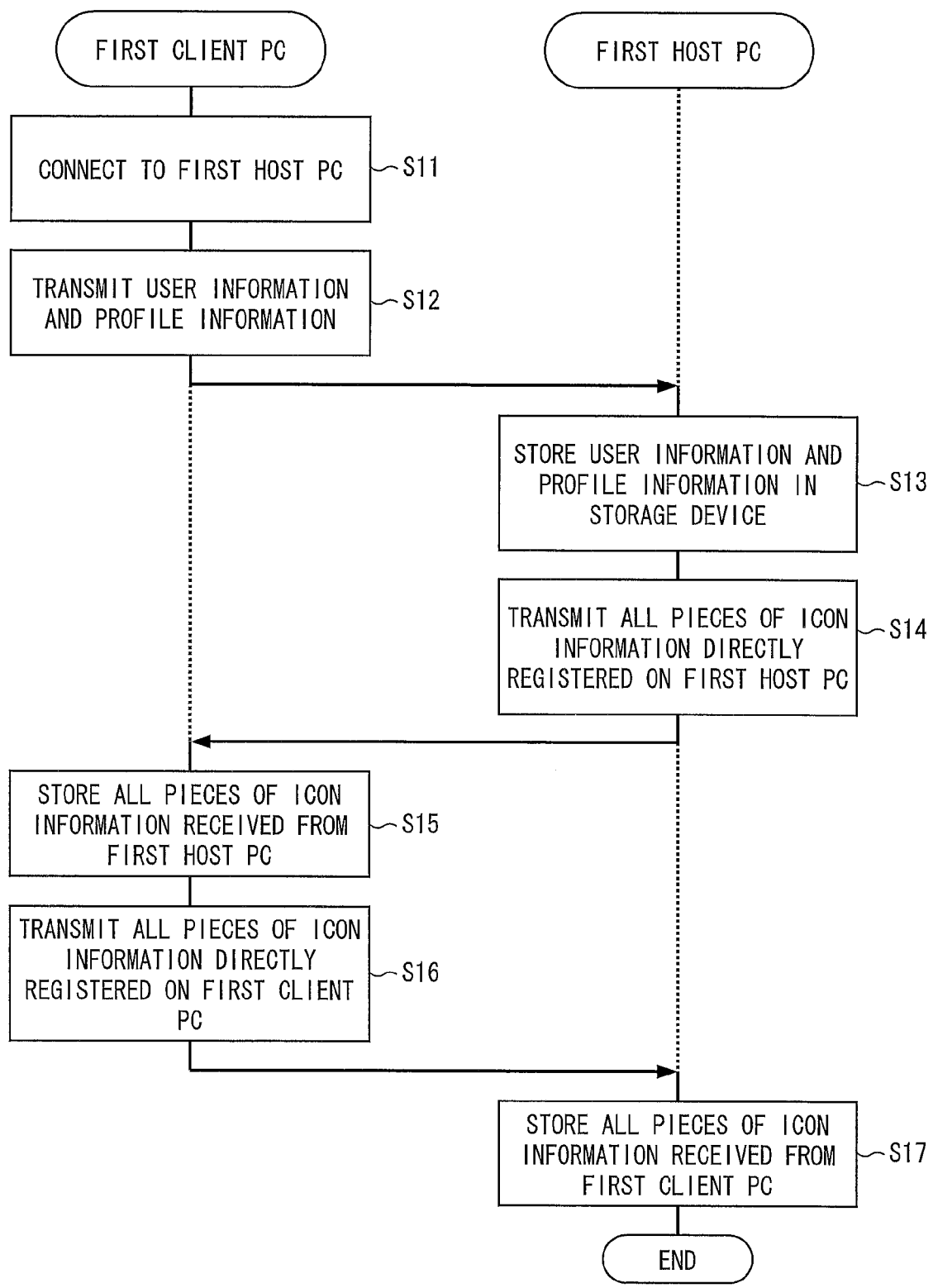
FIG. 8 is a flowchart illustrating how operations are conducted between the first client PC and the first host PC (which are illustrated in FIG. 1) after the first client PC is connected to the first host PC.

The following description will discuss how operations are conducted between the first client PC 3 and the first host PC 1 after the first client PC 3 is connected to the first host PC 1 in the image processing system of FIG. 1. FIG. 8 is a flowchart illustrating how operations are conducted between the first client PC 3 and the first host PC 1 after the first client PC 3 is connected to the first host PC 1. The operations include a process conducted in a case where login information (user identifier) of the first client PC 3 has already been registered on the first host PC 1 (a process conducted in a case where the first client PC 3 has been registered through the process of FIG. 7).

According to FIG. 8, when the first client PC 3 is connected to the first host PC 1 via the network 6 (S11), the control device 31 of the first client PC 3 transmits, to the first host PC 1 via the communication device 33 and the network 6, user information and profile information which are stored in the storage device 32 (S12). The connection is established between the first client PC 3 and the first host PC 1, when the control device 31 transmits a connection request, which is made by a user via the input device 34, to the first host PC 1 via the communication device 33 and the network 6.

The control device 11 of the first host PC 1 receives, via the network 6 and the communication device 13, the user information and the profile information which have been transmitted from the first client PC 3. The control device 11 of the first host PC 1 controls the storage device 12 to store the user information and the profile information (S13).

In a case where the control device 11 controls the storage device 12 to store the user information, the control device 11 determines whether or not a user identifier of one of pieces of individual user information contained in the user information matches one of user identifiers of pieces of individual user information which have been already stored in the storage device 12. In a case where the control device 11 determines that a user identifier of one of the pieces of individual user information contained in the user information matches one of the user identifiers of the pieces of individual user information which have been already stored in the storage device 12, the piece of individual user information, having such one of the user identifiers, which has been already stored in the storage device 12 is overwritten by the one of the pieces of individual user information, having such a user identifier, contained in the user information. In contrast, in a case where the control device 11 determines that a user identifier of one of the pieces of individual user information contained in the user information does not match any one of the user identifiers of the pieces of individual user information which have been already stored in the storage device 12, such one of the pieces of individual user information contained in the user information is newly registered on the storage device 12. The number of users is increased in the user information by the number of newly registered pieces of individual user information.

In a case where the control device 11 of the first host PC 1 controls the storage device 12 to store the profile information, the control device 11 of the first host PC 1 determines whether or not a profile identifier of one of pieces of individual profile information contained in the profile information matches one of profile identifiers of pieces of individual profile information which have been already stored in the storage device 12. In a case where the control device 11 determines that a profile identifier of one of the pieces of individual profile information contained in the profile information matches one of the profile identifiers of the pieces of individual profile information which have been already stored in the storage device 12, the piece of individual profile information, having such one of the profile identifiers, which has been already stored in the storage device 12 is overwritten by the one of the pieces of individual profile information, having such a profile identifier, contained in the profile information. In contrast, in a case where the control device 11 determines that a profile identifier of one of the pieces of individual profile information contained in the profile information does not match any one of the profile identifiers of the pieces of individual profile information which have been already stored in the storage device 12, such one of the pieces of individual profile information contained in the profile information is newly registered on the storage device 12. The number of profiles is increased in the profile information by the number of newly registered pieces of individual profile information.

The control device 11 of the first host PC 1 transmits, to the first client PC 3, all pieces of icon information, stored in the storage device 12, which have been directly registered on the first host PC 1 (registered on the first host PC 1) by, for example, a manager of the first host PC 1 (S14). Each of the all pieces of icon information to be transmitted contains an icon source which corresponds to a host ID of the first host PC 1. Note that each icon contained in icon information, to be transmitted from the first host PC 1 to the first client PC 3, is associated with a corresponding piece of operation setting information of the multifunction peripheral 5. Such corresponding piece of operation setting information is contained in profile information.

Upon receipt, from the first host PC 1 via the network 6 and the communication device 33, of the all pieces of icon information which have been directly registered on the first host PC 1, the control device 31 controls the storage device 32 to store the all pieces of icon information (S15). Note that the icon source of the icon information to be stored in the storage device 32 still corresponds to the host ID of the first host PC 1.

After S15, the control device 31 of the first client PC 3 transmits, to the first host PC 1 via the communication device 33 and the network 6, icon information, stored in the storage device 32, which has been directly registered on (registered on) the first client PC 3 by, for example, a user (S16). The icon information to be transmitted contains an icon source which corresponds to a client ID of the first client PC 3. Note that each icon contained in icon information, to be transmitted from the first client PC 3 to the first host PC 1, is associated with a corresponding piece of operation setting information of the multifunction peripheral 5. Such corresponding piece of operation setting information is contained in profile information.

Upon receipt, from the first client PC 3 via the network 6 and the communication device 13, of the icon information which has been directly registered on the first client PC 3, the control device 11 of the first host PC 1 controls the storage device 12 to store the icon information (S17). Note that the icon source of the icon information to be stored in the storage device 12 still corresponds to the client ID of the first client PC 3.

The above operations allow (i) the first host PC 1 to use the icon information which has been directly registered on the first client PC 3 and (ii) the first client PC 3 to use the icon information directly registered on the first host PC 1.

(How a Host PC and a Plurality of Client PCs Share Icon Information)

Figure 9:
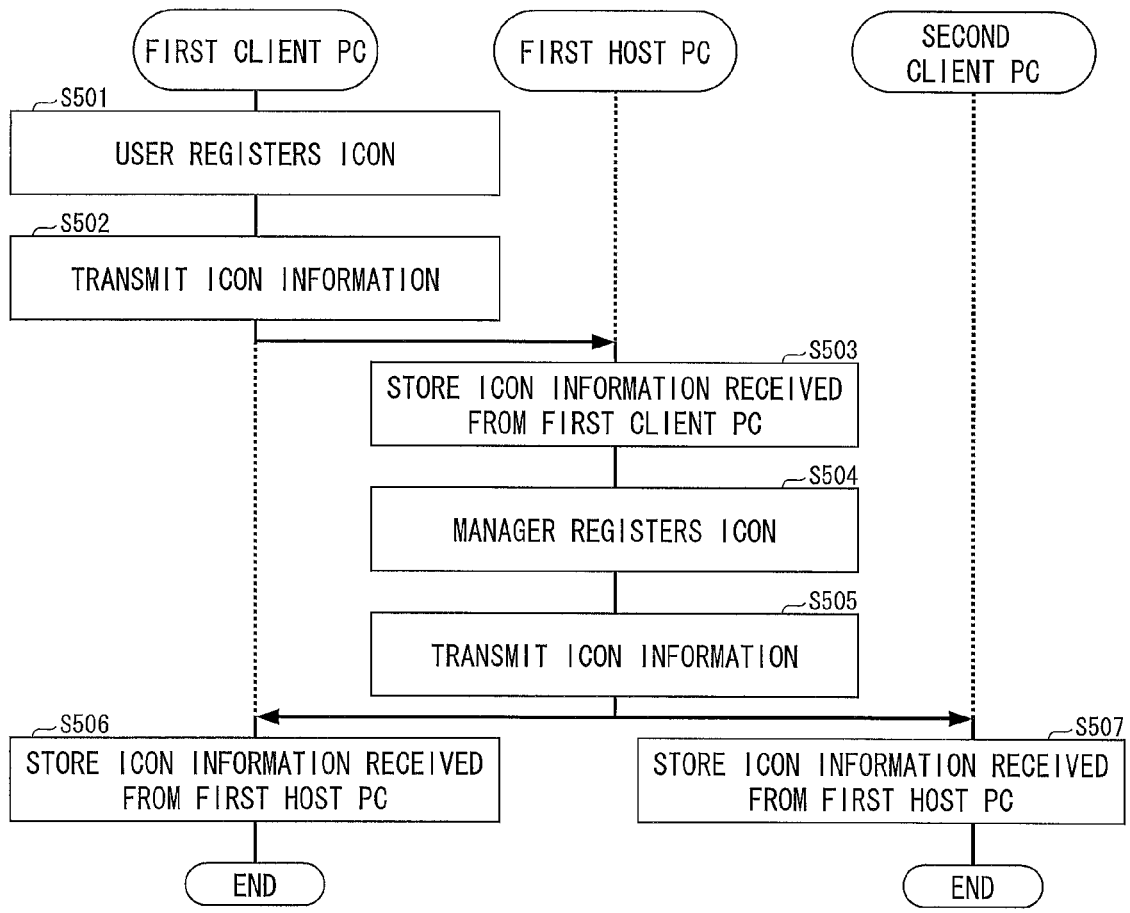
FIG. 9 is a flowchart illustrating how the first host PC (illustrated in FIG. 1) and a plurality of client PCs which are connected to the first host PC share icon information.

The following description will discuss how a host PC and a plurality of client PCs, which are connected to the host PC, share icon information in the image processing system of the present embodiment. FIG. 9 is a flowchart illustrating how the host PC and the plurality of client PCs share icon information.

As illustrated in FIG. 9, when a user newly registers an icon on the first client PC 3 (S501), the control device 31 controls (i) the storage device 32 to store icon information of the registered icon and (ii) the icon information to be transmitted to the first host PC 1 via the communication device 33 and the network 6 (S502).

Upon receipt of the icon information from the first client PC 3, the control device 11 of the first host PC 1 controls the storage device 12 to store the icon information (S503). Note that an icon source of the icon information, to be stored in the storage device 12, corresponds to the client ID of the first client PC 3.

In a case where a manager of the first host PC 1 newly registers an icon on the first host PC 1 (S504), the control device 11 controls (i) the storage device 12 to store icon information of the registered icon and (ii) the icon information to be transmitted to the first and second client PCs 3 and 4 via the communication 13 and the network 6 (S505). Note that each icon contained in icon information, to be transmitted from the first host PC 1 to the first client PC 3, is associated with a corresponding piece of operation setting information of the multifunction peripheral 5. Such corresponding piece of operation setting information is contained in profile information.

Upon reception of the icon information from the first client PC 3, the control devices 31 and 41 of the first and second client PCs 3 and 4 control the respective storage devices 32 and 42 to store the icon information (S506 and S507). Note that an icon source of the icon information, to be stored in the storage devices 32 and 42, corresponds to the host ID of the first host PC 1.

(How Icon Information is Deleted after Disconnection)

Figure 10:
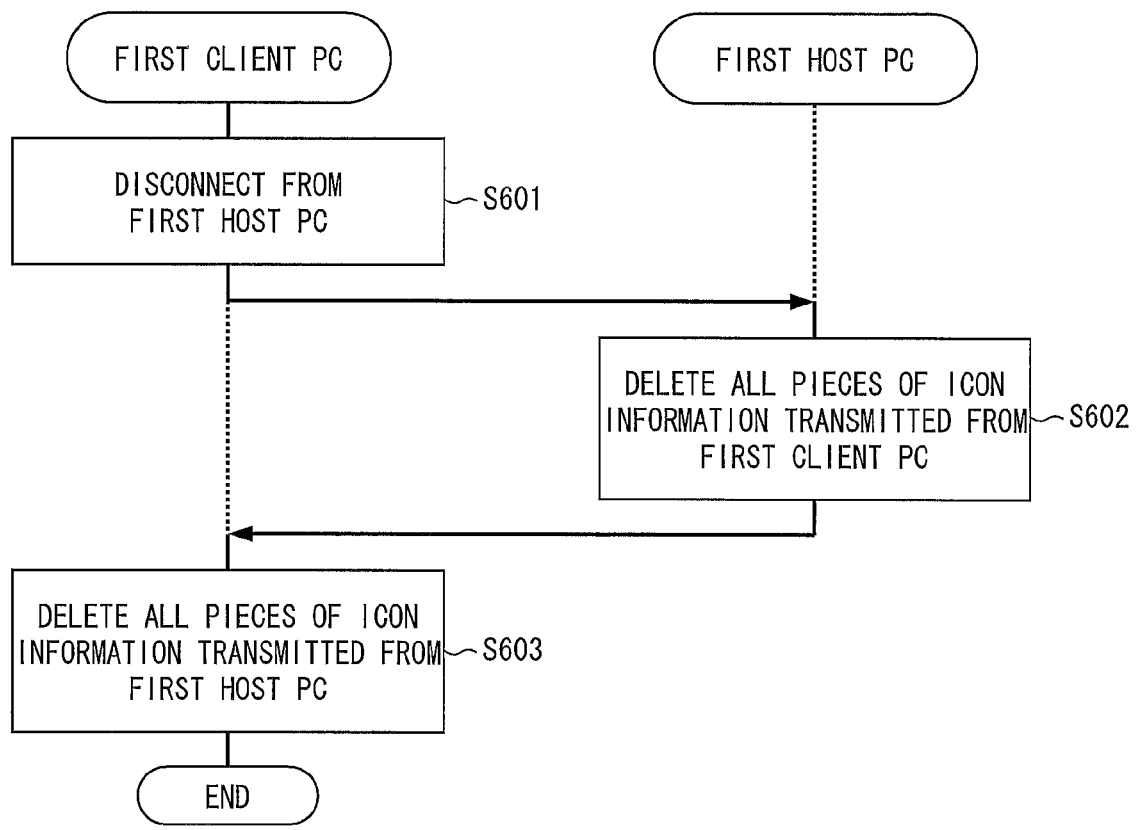
FIG. 10 is a flowchart illustrating how the first host PC and the first client PC (which are illustrated in FIG. 1) operate when the first client PC is disconnected from the first host PC.

The following description will discuss how icon information is deleted in a case where a client PC is disconnected from a host PC in the image processing system of the present embodiment. FIG. 10 is a flowchart illustrating how the host PC and the client PC operate when the client PC is disconnected from the host PC.

As illustrated in FIG. 10, upon disconnection of the first client PC 3, which is being connected to the first host PC 1, from the first host PC 1 (S601), the control device 11 of the first host PC 1 deletes, from the storage device 12, all pieces of icon information, stored in the storage device 12, which have been transmitted from the first client PC 3 (S602).

Note that the disconnection is established between the first client PC 3 and the first host PC 1, when the control device 31 transmits a disconnection request, which is made by a user via the input device 34, to the first host PC 1 via the communication device 33 and the network 6. Upon reception of the disconnection request from the first client PC 3, the control device 11 of the first host PC 1 deletes the all pieces of icon information from the storage device 12. Note that an icon source of the icon information to be deleted corresponds to the client ID of the first client PC 3.

After S602, the control device 31 of the first client PC 3 deletes, from the storage device 32, all pieces of icon information, stored in the storage device 32, which have been transmitted from the first host PC 1 (S603). Note that an icon source of the icon information to be deleted corresponds to the host ID of the first host PC 1.

As such, according to the image processing system of the present embodiment, upon disconnection of the first client PC 3 from the first host PC 1, (i) the all pieces of icon information whose icon source corresponds to the client ID of the first client PC 3 are deleted from the storage device 12 of the first host PC 1, and (ii) the all pieces of icon information whose icon source corresponds to the host ID of the first host PC 1 are deleted from the storage device 32 of the first client PC 3. This can prevent an available storage region of each of the storage devices 12 and 32 from being reduced due to useless icon information being accumulated in the each of the storage devices 12 and 32.

(Case where Icon Source of Icon Information Corresponds to User ID)

Note that a user ID, registered on an OS (Operating System) of the first client PC 3, can be employed as an icon source of icon information which has been directly registered on the first client PC 3.

In a case where (i) such a user ID is employed as the icon source of the icon information and (ii) icons (icon images) of icon information, which have been directly registered on the first client PC 3, are listed, only such icons which each user registered can be extracted and listed for the each user. Therefore, in a case where (i) the each user does not want other users to browse the icons which have been registered by the each user or (ii) the each user wants to display only the icons which have been registered by the each user, it is possible to address such a case. In such a case, the first client PC 3 operates as follows.

Figure 11:
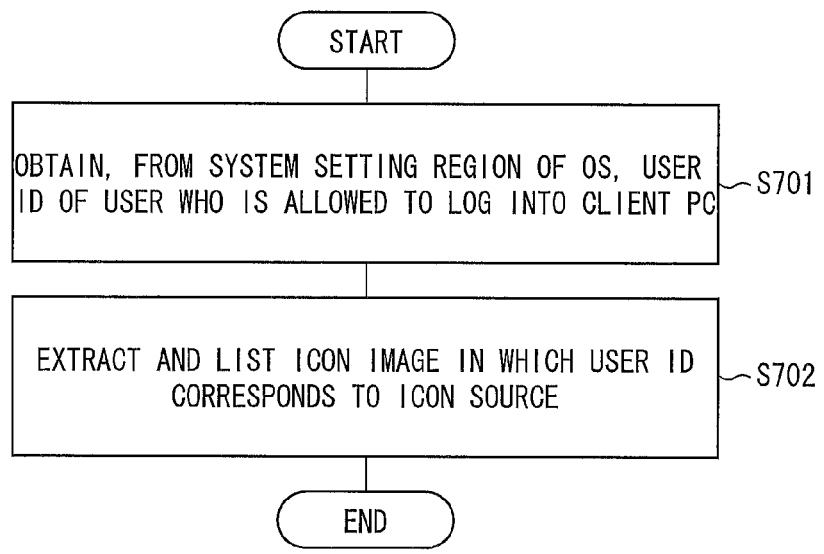
FIG. 11 is a flowchart illustrating how the first client PC (illustrated in FIG. 1) operates when a display device of the first client PC lists only icons whose specific user IDs correspond to respective icon sources.

FIG. 11 is a flowchart illustrating how the first client PC 3 operates in a case where (i) a user ID, registered on an OS of the first client PC 3, is employed as an icon source of icon information and (ii) the display device 35 lists only icons whose specific user IDs correspond to respective icon sources.

As illustrated in FIG. 11, the control device 31 first obtains, from a system setting region of the first client PC 3, a user ID of a user who is allowed to log into the first client PC 3 (S701).

Next, the control device 31 extracts, from the storage device 32, an icon of icon information in which the obtained user ID corresponds to an icon source, and then controls the display device 35 to display only such an icon (S702).

(How Icon Information is Directly Registered on Host PC or Client PC)

The following description will discuss how icon information is directly registered on the first host PC 1 or the first client PC 3. Note here that how icon information is directly registered on the first client PC 3 will be described below.

In a case where an icon is newly registered on the first client PC 3, it is possible to employ, as an icon image, an image such as (i) an image, stored in the storage device 32, which has been taken with a digital camera or (ii) an image, stored in the storage device 32, which has been created by means of paint software of the first client PC 3.

Figure 12:
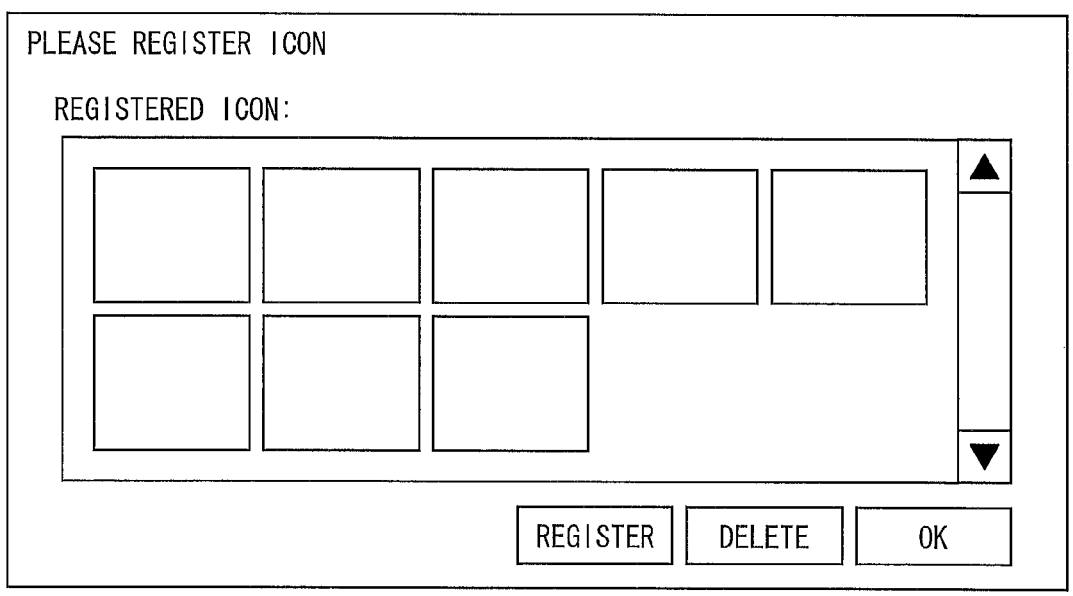
FIG. 12 is an explanatory view illustrating an icon registration screen to be displayed on the display device of the first client PC illustrated in FIG. 1.

When a user instructs, via the input device 34, an icon to be registered on the first client PC 3, the control device 31 controls the display device 35 to display an icon registration screen. FIG. 12 is an explanatory view illustrating an icon registration screen (user interface for registration of an icon) to be displayed on the display device 35 of the first client PC 3.

In a case where icon information is registered on the first client PC 3, an image to be registered as an icon is displayed on the icon registration screen. The user selects the displayed image by use of, for example, a mouse and then clicks a REGISTER button. This causes the image to be registered as a new icon image.

(How Profile is Created and Added in Client PC)

The following description will discuss how a profile (a scan profile or a print profile) is created and added in the first client PC 3. Note that the first client PC 3 of the present embodiment is configured to edit (modify) and delete a profile (a scan profile or a print profile) which is stored in the storage device 32.

The first client PC 3 can further assign a newly created icon to an added profile or a modified profile as a profile icon.

Figure 13:
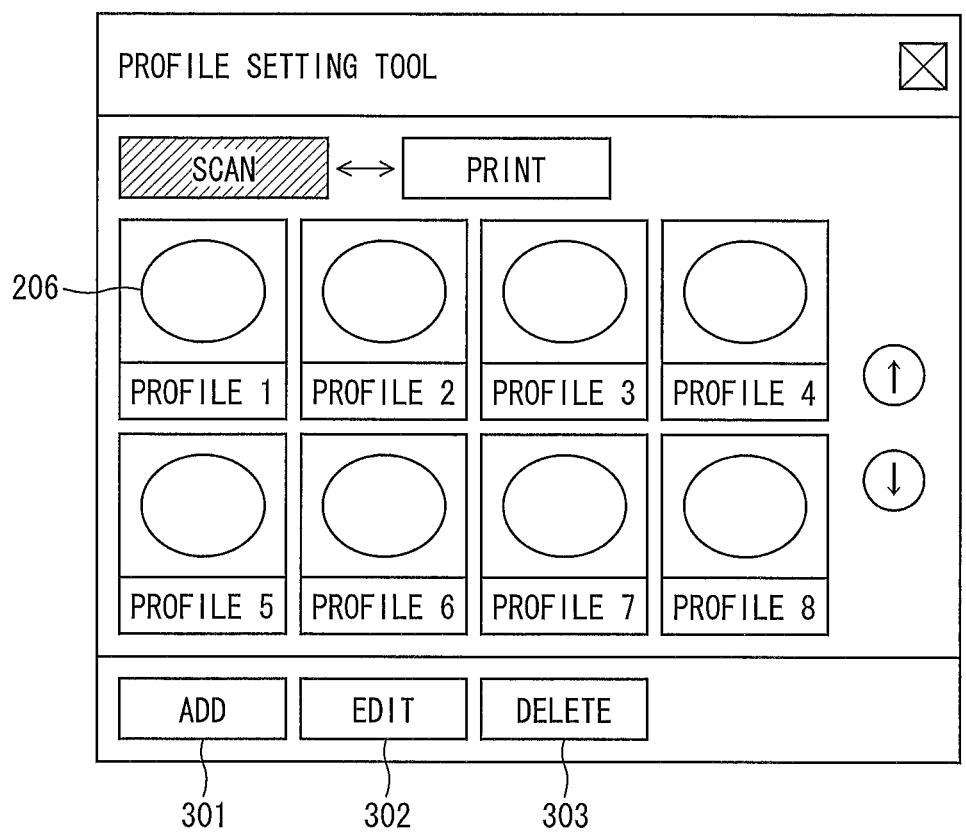
FIG. 13 is an explanatory view illustrating a first screen to be displayed on the display device of the first client PC illustrated in FIG. 1, via which first screen a profile is to be added and/or modified.
Figure 14:
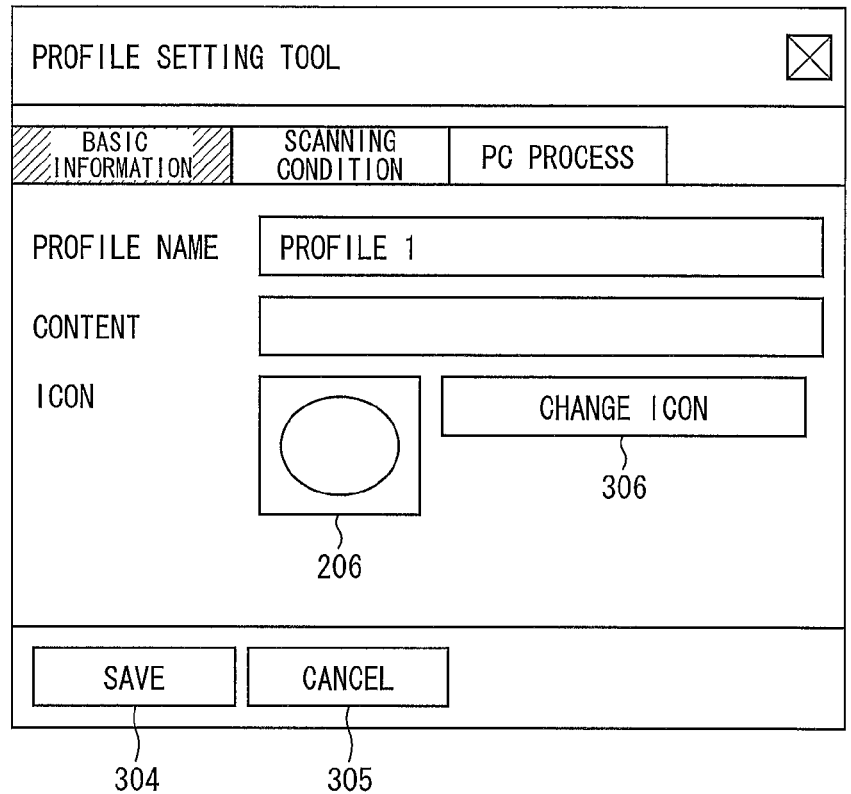
FIG. 14 is an explanatory view illustrating a second screen to be displayed on the display device of the first client PC, via which second screen a profile is to be added and/or modified.
Figure 15:
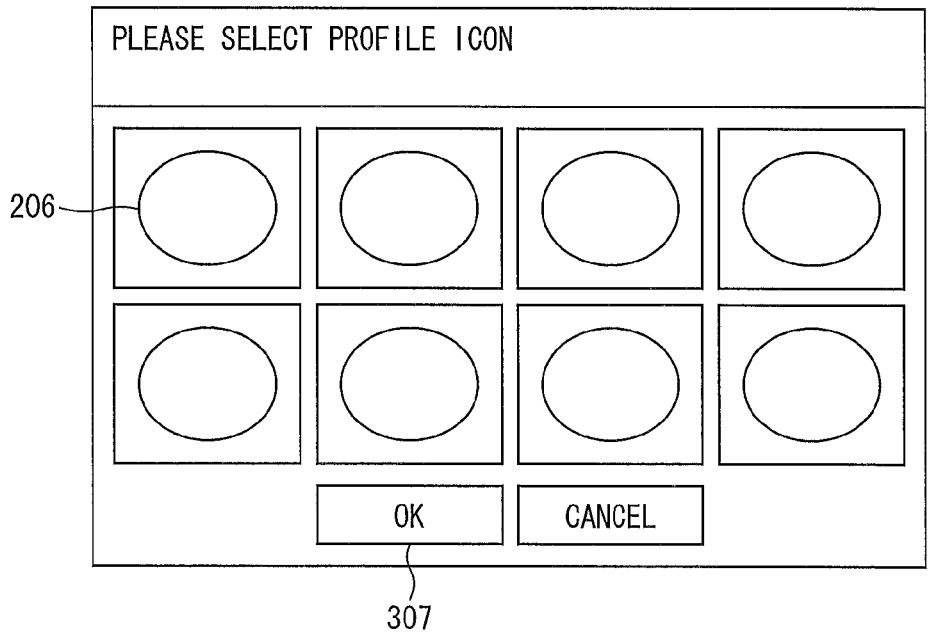
FIG. 15 is an explanatory view illustrating a third screen to be displayed on the display device of the first client PC, via which third screen a profile is to be added and/or modified.

FIG. 13 is an explanatory view illustrating a first user interface (a first screen of a profile setting tool screen, an icon setting screen) to be displayed on the display device 35 of the first client PC 3, via which first user interface a profile is to be added and/or modified. FIG. 14 is an explanatory view illustrating a second user interface (a second screen of the profile setting tool screen, an icon setting screen) to be displayed on the display device 35, via which second user interface a profile is to be added and/or modified. FIG. 15 is an explanatory view illustrating a third user interface (a third screen of the profile setting tool screen, an icon setting screen) to be displayed on the display device 35, via which third user interface a profile is to be added and/or modified. The profile setting tool screens make transitions from the first screen to the third screen through the second screen.

The first client PC 3 is configured so as to add or edit (modify) a scan profile or a print profile in response to a user's entering operation to the profile setting tool screen. In order to add or edit (modify) the scan profile or the print profile, the control device 31 of the first client PC 3 requests, e.g., the first host PC 1 to transmit, to the control device 31, data for displaying the profile setting tool screen so as to obtain the data for displaying the profile setting tool screen.

Subsequently, the control device 31 controls the display device 35 to display the first screen (see FIG. 13) of the profile setting tool screen in accordance with the data thus obtained. The profile setting tool screen corresponds to the first screen of the profile setting tool screen (see FIG. 13). The first screen displays (i) a plurality of profiles stored in the storage device 32 of the first client PC 3 and (ii) respective corresponding profile icons. In FIG. 13, the plurality of profiles are associated with the respective corresponding profile icons. The plurality of profiles are, for example, created in advance by a user and are then stored in the storage device 32.

On the first screen of the profile setting tool screen, a user pushes an ADD button 301 or pushes an EDIT button 302 after selecting a profile to be modified. Alternatively, the user pushes a DELETE button 303 after selecting a profile to be deleted.

For example, in a case where a user pushes the EDIT button 302 after selecting a profile to be modified, the control device 31 of the first client PC 3 controls the display device 35 to display the second screen (see FIG. 21) of the profile setting tool screen. The user can determine, on the second screen, basic information of, a scanning condition of, and a PC processing condition of the profile to be modified. When the user pushes a SAVE button 304, the basic information, the scanning condition or the PC processing condition which has been determined is stored. When the user pushes a CANCEL button 305, the basic information, the scanning condition or the PC processing condition which has been determined is cancelled.

When the user pushes a CHANGE ICON button 306, the control device 31 of the first client PC 3 controls the display device 35 to display the third screen (see FIG. 15) of the profile setting tool screen. The third screen displays profile icons 206 each of which is not assigned to any of the profiles that have been stored in the storage device 12 of the first host PC 1. Each of the profile icons 206 which are displayed on the third screen is (i) a profile icon which has been stored in the first client PC 3 or (ii) a profile icon obtained by requesting the first host PC 1 to transmit the profile icon which has been stored in the first host PC 1. Note that the profile icon 206 which has been stored in the first client PC 3 is a profile icon which has been registered via the icon registration screen illustrated in FIG. 12.

The user can select, as a profile icon 206 of a profile 1 (see FIG. 14), one of the profile icons 206 displayed on the third screen (see FIG. 15). The control device 31 of the first client PC 3 provisionally assigns the profile icon 206 selected by the user to the profile 1 as the profile icon 206 of the profile 1, when the user pushes an OK button 307 after selecting the profile icon 206.

Thereafter, the control device 31 controls the display device 35 to have a transition from the third screen (see FIG. 15) to the second screen (see FIG. 14) in the profile setting tool screen. The second screen displays the profile icon 206 selected by the user on the third screen (see FIG. 15). When the user pushes the SAVE button 304 on the second screen (see FIG. 14), the control device 31 controls the storage device 32 to store, as the profile icon 206 of the profile 1, the profile icon 206 that has been changed.

Note that information on the profile icon 206 stored in the storage device 32 is transmitted from the first client PC 3 to the first host PC 1, and is then stored in the storage device 12 of the first host PC 1.

Figure 16:
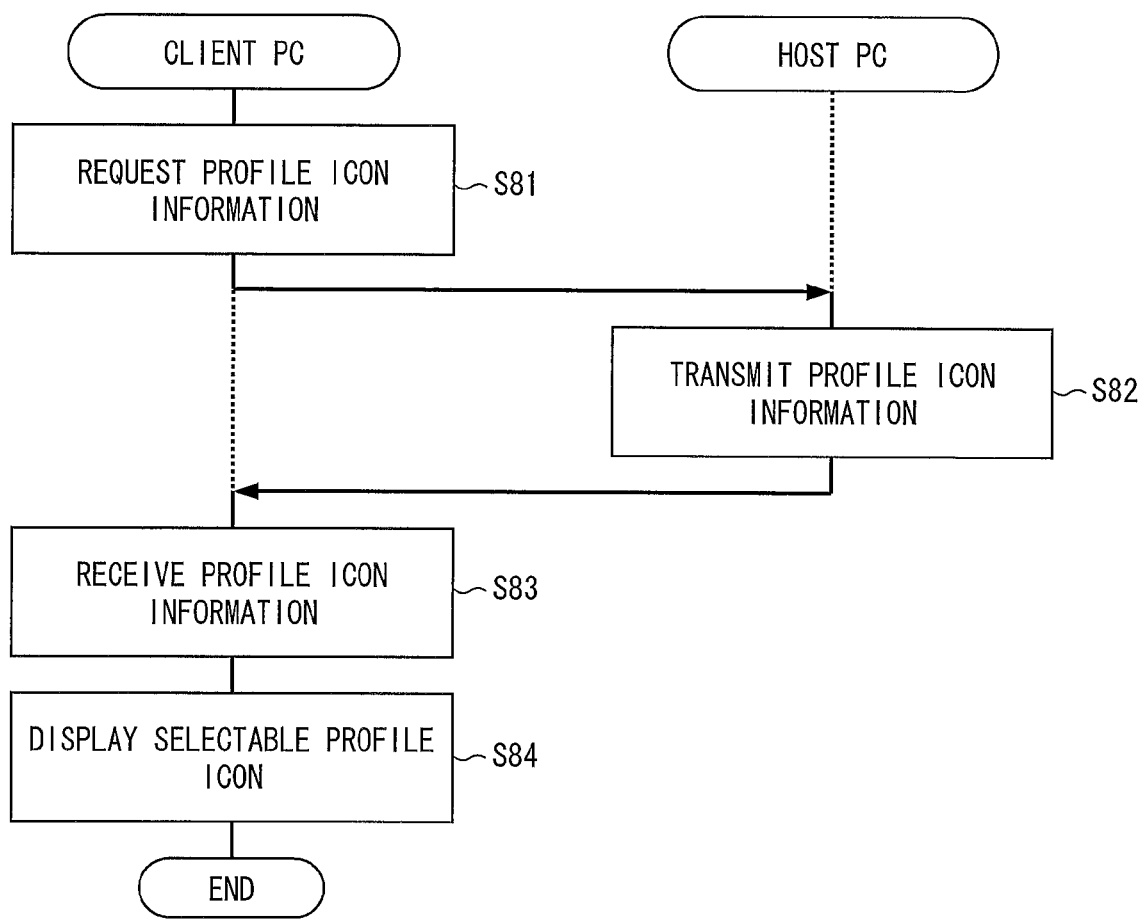
FIG. 16 is a flowchart illustrating how the first client PC and the first host PC operate when the third screen (illustrated in FIG. 15) of a profile setting tool screen is displayed.

The following description will discuss how the first client PC 3 and the first host PC 1 operate when the third screen (see FIG. 15) of the profile setting tool screen is displayed. FIG. 16 is a flowchart illustrating how the first client PC 3 and the first host PC 1 operate when the third screen (see FIG. 15) of the profile setting tool screen is displayed.

When a user pushes the CHANGE ICON button 306 on the second screen (see FIG. 14) of the profile setting tool screen, the control device 31 of the first client PC 3 requests, via the communication device 33 and the network 6, the first host PC 1 to transmit profile icon information (S81) (see FIG. 15). The profile icon information is indicative of a list of profile icons (the profile icons 206 of FIG. 25) which correspond to the respective profiles stored in the storage device 12 of the first host PC 1.

The control device 11 of the first host PC 1 receives a request for the profile icon information, via the network 6 and the communication device 13. In response to the request, the control device 11 of the first host PC 1 transmits, to the first client PC 3 via the communication device 13 and the network 6, the profile icon information on the profiles stored in the storage device 12 (S82). This causes the control device 31 of the first client PC 3 to receive the profile icon information via the network 6 and the communication device 33 (S83).

The control device 31 of the first client PC 3 controls the display device 35 to display, as selectable profile icons, all profile icons that (i) are stored in the storage device 32 and (ii) are not contained in the profile icon information received from the first host PC 1 (S84). The all profile icons are displayed on the third screen (see FIG. 15) of the profile setting tool screen.

According to the image processing system of the present embodiment, profile icons, which have not been assigned to any of the profiles stored in the storage device 12 of the first host PC 1, are thus assigned to respective profiles each of which has been newly created (an added profile) or modified in the first client PC 3. This makes it possible to assign different profile icons to the respective all profiles to be displayed on the display device 55 of the multifunction peripheral 5, even in a case where the all profiles are profiles each of which has been newly created or edited in the first client PC 3. It is therefore possible to prevent a user from wrongly selecting a profile. Such a wrong selection is caused by assigning an identical profile icon to different profiles.

Figure 17:
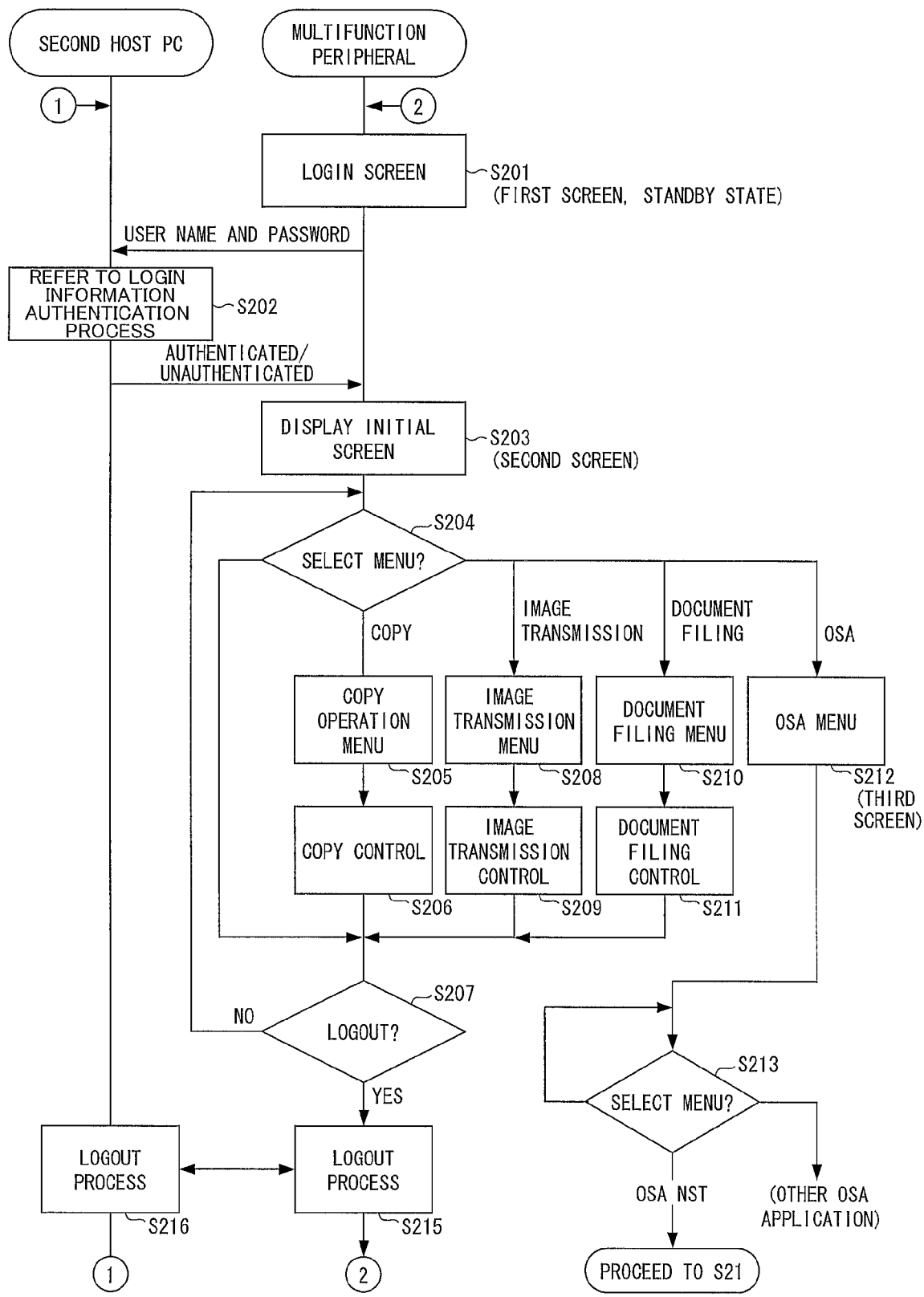
FIG. 17 is a flowchart illustrating operations conducted in an image processing apparatus illustrated in FIG. 1 when and after a user logins into a multifunction peripheral which is on standby.
Figure 18:
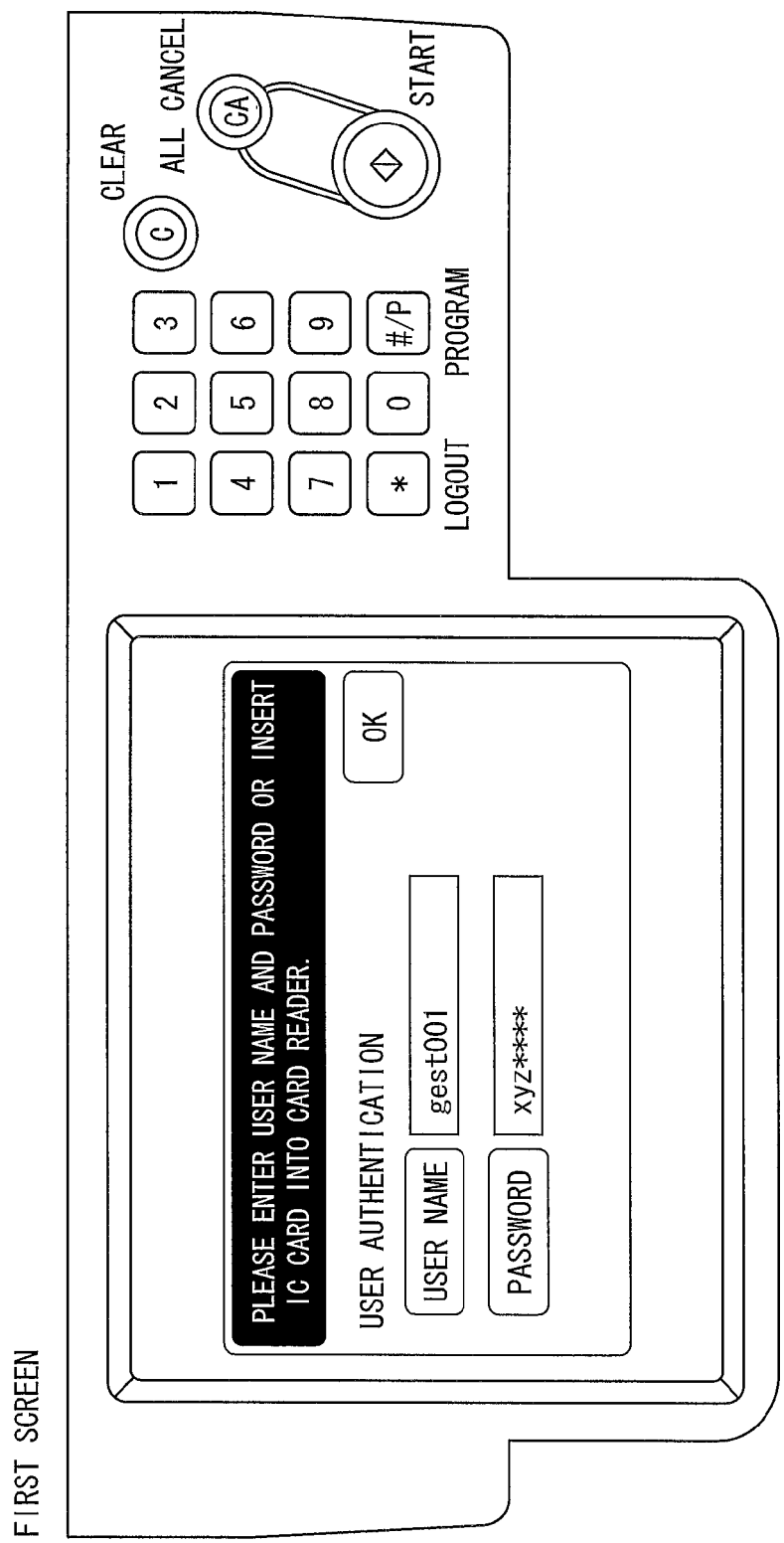
FIG. 18 is an explanatory view illustrating a first screen (login screen) to be displayed on a display device of the multifunction peripheral in S201 of FIG. 17.
Figure 19:
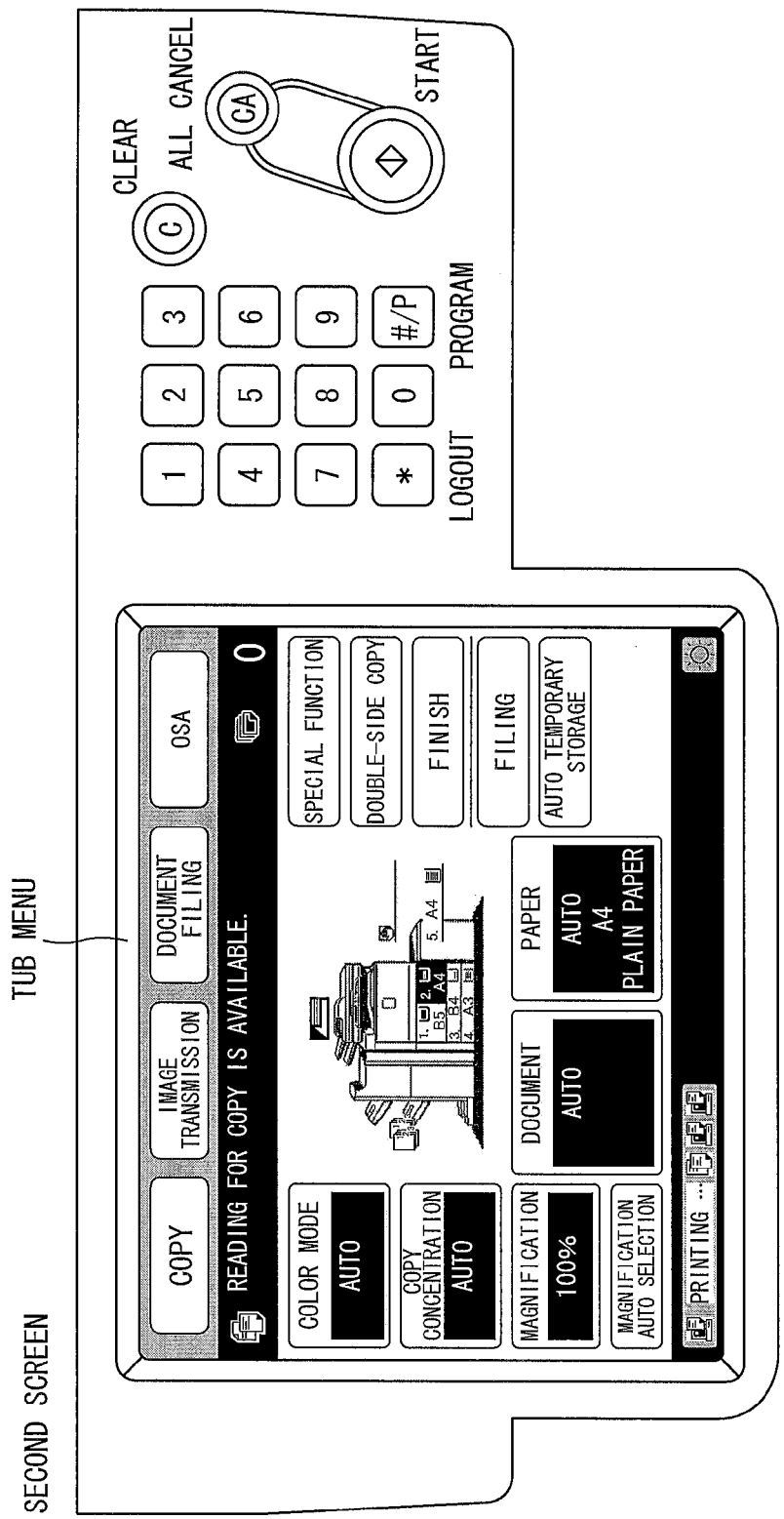
FIG. 19 is an explanatory view illustrating a second screen (initial screen) to be displayed on the display device of the multifunction peripheral in S203 of FIG. 17.
Figure 20:
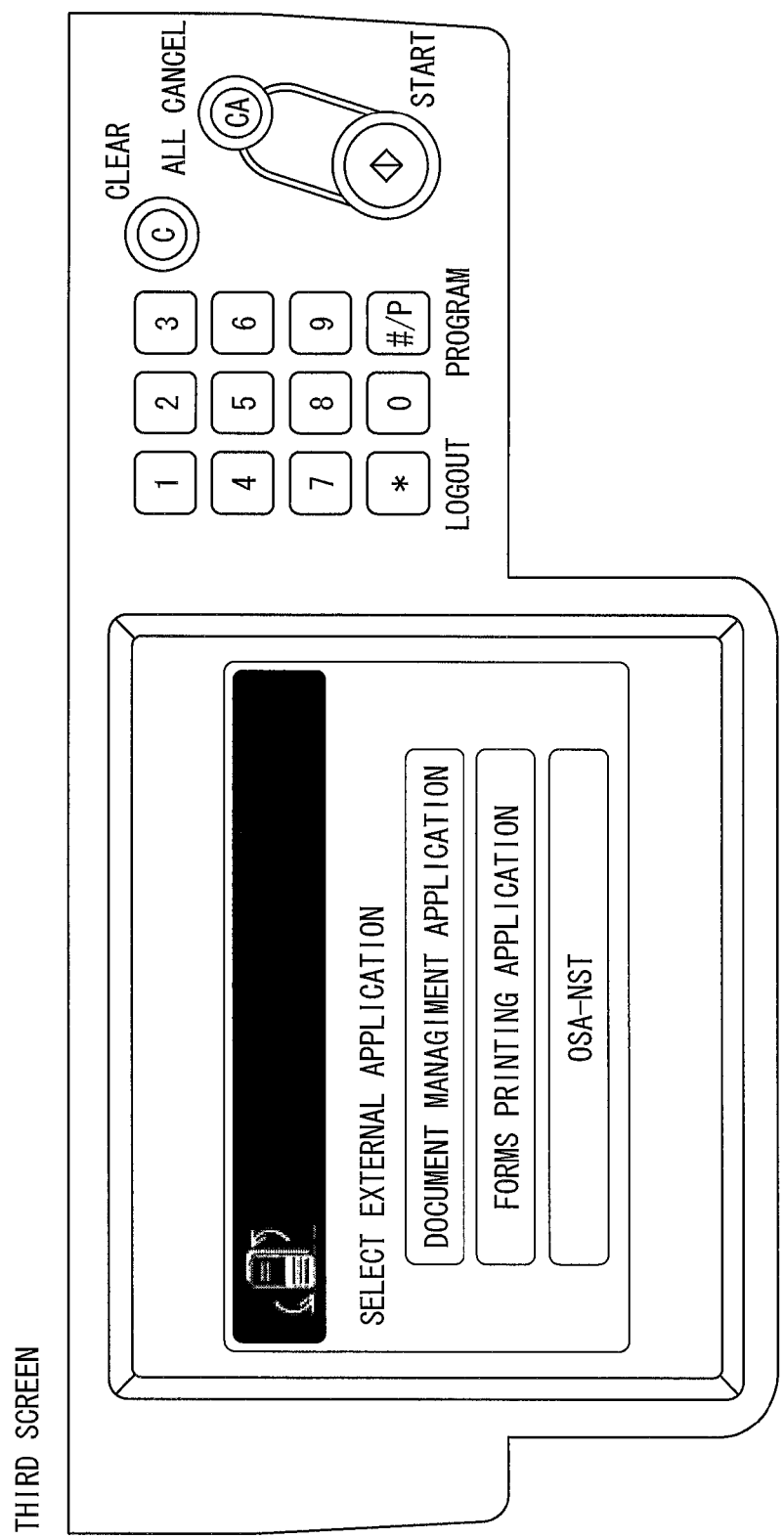
FIG. 20 is an explanatory view illustrating a third screen to be displayed on the display device of the multifunction peripheral in S212 of FIG. 17.

The following description will discuss how a host PC (e.g., the second host PC 2) and the multifunction peripheral 5 operate when and after a user logs into the multifunction peripheral 5 that is standing by. FIG. 17 is a flowchart illustrating how the second host PC 2 and the multifunction peripheral 5 operate when and after a user logs into the multifunction peripheral 5 that is standing by. Note here that, for example, the second host PC 2 operates as an account managing server. FIG. 18 is an explanatory view illustrating a first screen (login screen) to be displayed on the display device 55 of the multifunction peripheral 5 in S201 of FIG. 17. FIG. 19 is an explanatory view illustrating a second screen (initial screen) to be displayed on the display device 55 of the multifunction peripheral 5 in S203 of FIG. 17. FIG. 20 is an explanatory view illustrating a third screen to be displayed on the display device 55 of the multifunction peripheral 5 in S212 of FIG. 17.

According to the image processing system of the present embodiment, the second host PC 2 conducts a user authentication process with respect to login information entered to the multifunction peripheral 5 while the multifunction peripheral 5 is standing by (later described). This causes a user who can use the multifunction peripheral 5 to be limited.

A user who wishes to use the multifunction peripheral 5 goes all the way to the multifunction peripheral 5 so as to log into the multifunction peripheral 5 by (i) manually entering a user name and a password via the first screen (login screen) (see FIG. 18) displayed on the display device 55 or (ii) automatically entering the user name and the password by, for example, presenting an IC card (mobile information storage medium) to the multifunction peripheral 5 (S201).

The user name and the password, entered via the first screen (login screen), are transmitted from the multifunction peripheral 5 to the second host PC 2.

The second host PC 2 conducts a user authentication process with respect to the user name and the password received from the multifunction peripheral 5 (S202).

In the image processing system of the present embodiment, in a case where the first client PC 3 is authorized to be temporarily connected to the network 6, (i) login information (individual login information) is obtained from the first client PC 3 connected to the network 6 and (ii) the login information is registered as provisional login information in the second host PC 2. This allows even the first client PC 3 (user), who is temporarily connected to the network 6 by use of the provisional login information, to use the multifunction peripheral 5 through the login in S201. Therefore, a manager of the second host PC 2 can easily manage the image processing system, instead of being troubled with a connection setting for a temporary user.

In a case where the second host PC 2 authorizes usage of the multifunction peripheral 5 in S202 (authenticated), the display device 55 of the multifunction peripheral 5 displays the second screen (initial screen) of FIG. 19 (S203). Note that a frequently used copy setting screen is generally displayed as a default second screen (initial screen).

When a user selects one of COPY, IMAGE TRANSMISSION, DOCUMENT FILING, and OSA from a tab menu on the second screen (initial screen) (S204), an operation mode is changed into a selected operation mode.

The display device 55 of the multifunction peripheral 5 displays a copy menu, an image transmission menu or a document filing menu (S205, S208 or S210) in accordance with the selected operation mode in S204.

When the user (i) selects desired one of the copy menu, the image transmission menu and the document filing menu, and then (ii) pushes a start key, the multifunction peripheral 5 carries out a copy control, an image transmission control or a document filing control (S206, S209 or S211) in accordance with the selected operation mode. When the user selects a logout process by pushing a "key (asterisk key)" (see FIG. 18) (S207), the multifunction peripheral 5 and the second host PC 2 conduct the logout process (S215 and S216), and then the multifunction peripheral 5 returns to a standby state.

When the user selects an OSA menu in S204, the display device 55 of the multifunction peripheral 5 displays the OSA menu on the third screen of FIG. 20 (S212).

Figure 21:
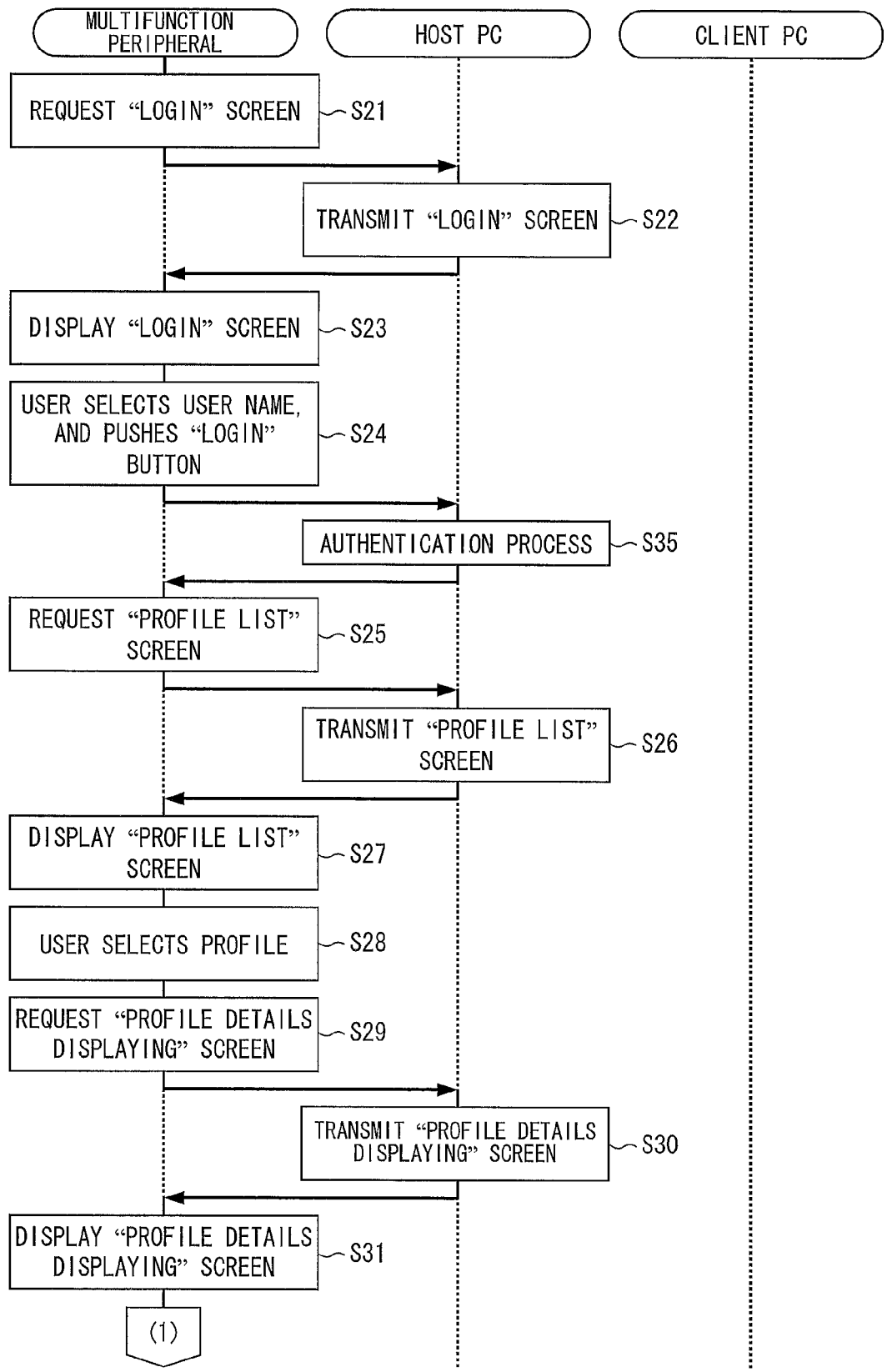
FIG. 21 is a flowchart illustrating a first part of an operation of the image processing system illustrated in FIG. 1 from logging into the image processing system until ending of scanning.

When "OSA NST" is selected on the third screen (S213), the multifunction peripheral 5 conducts a process of S21 of FIG. 21. "OSA NST" is executed in processes conducted after the process of S21. The display device 55 of the multifunction peripheral 5 changes displaying from FIG. 24 to FIG. 25 in accordance with a user's login operation.

Figure 22:
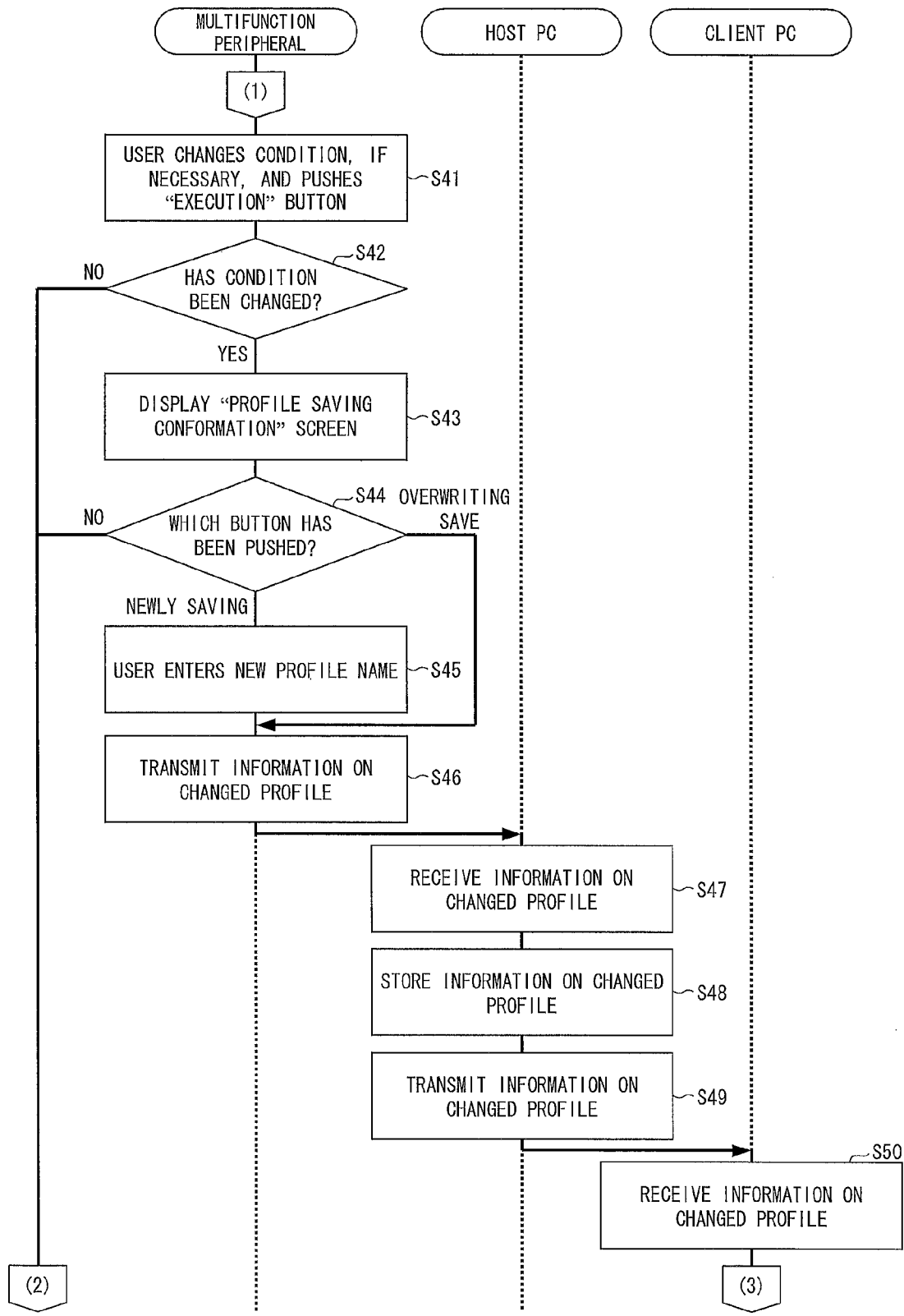
FIG. 22 is a flowchart illustrating a second part of the operation of the image processing system, the second part following the first part illustrated in FIG. 21.
Figure 23:
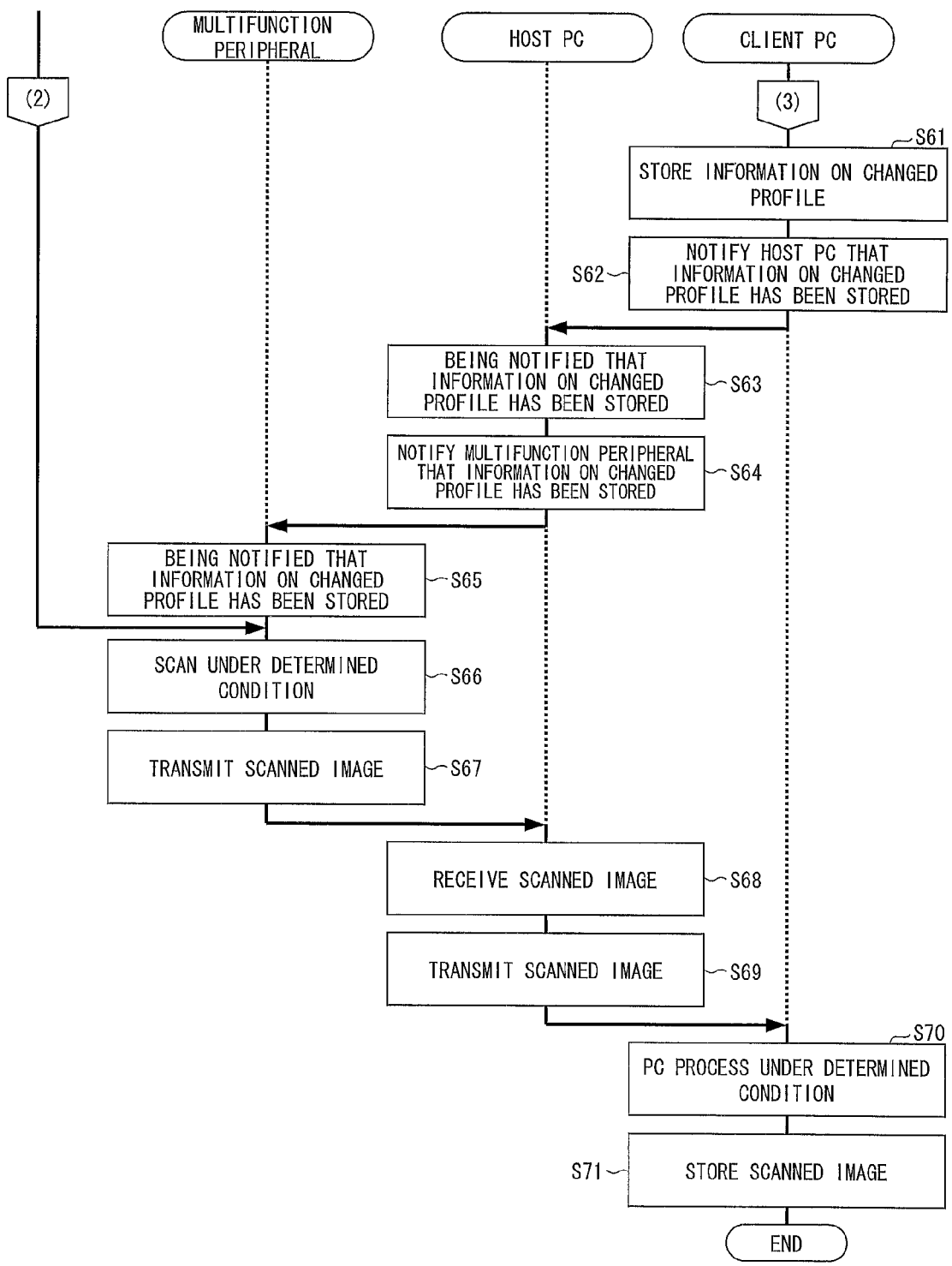
FIG. 23 is a flowchart illustrating a third part of the operation of the image processing system, the third part following the second part illustrated in FIG. 22.

The following description will discuss, with reference to FIGS. 21 through 27, how the image processing system operates from the logging of a user into the image processing system until scanning is ended. FIG. 21 is a flowchart illustrating a first part of the operation of the image processing system from the logging of the user into the image processing system until the ending of the scanning. FIG. 22 is a flowchart illustrating a second part of the operation of the image processing system, the second part following the first part illustrated in FIG. 21. FIG. 23 is a flowchart illustrating a third part of the operation of the image processing system, the third part following the second part illustrated in FIG. 22.

Figure 24:
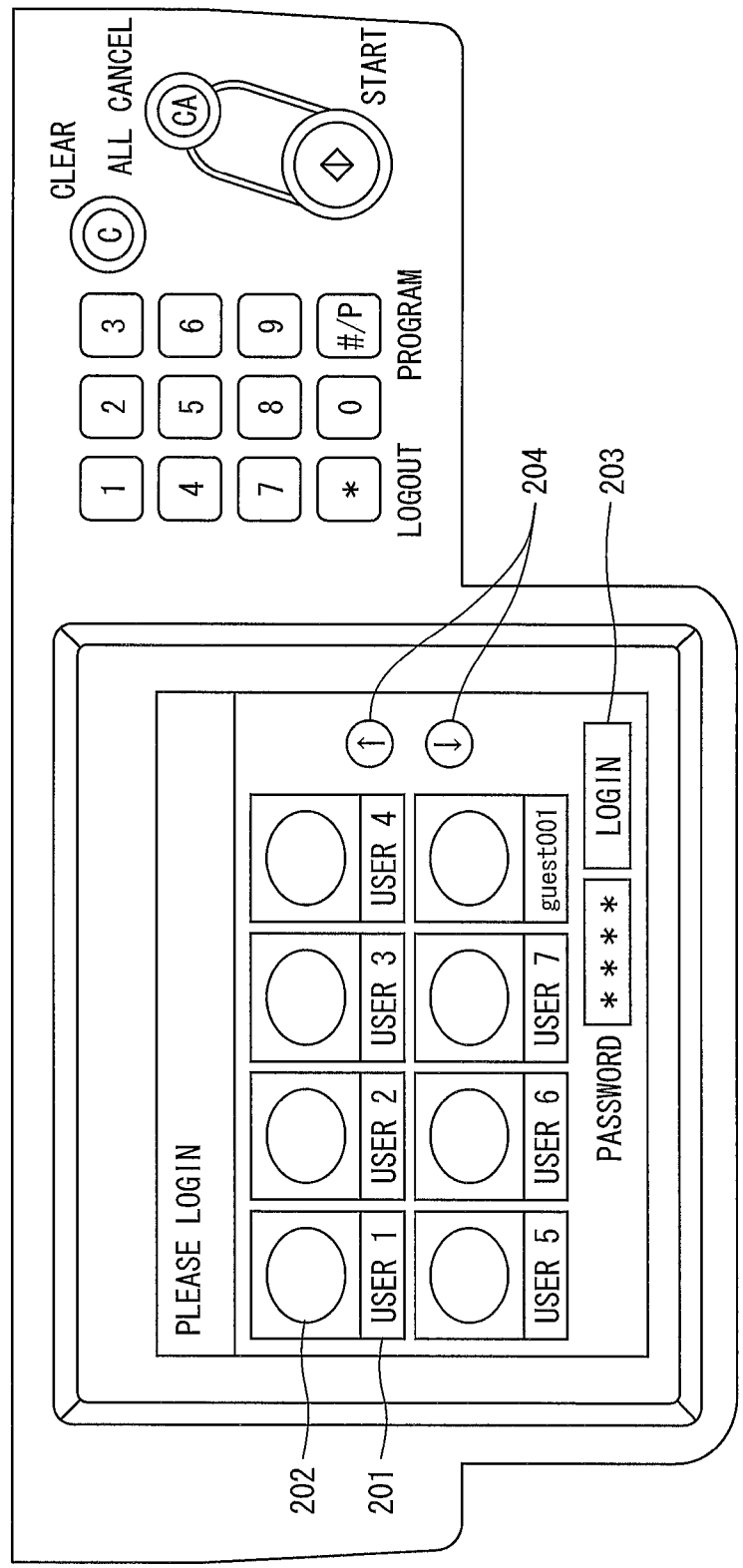
FIG. 24 is an explanatory view illustrating a login screen to be displayed in S23 of FIG. 21.
Figure 25:
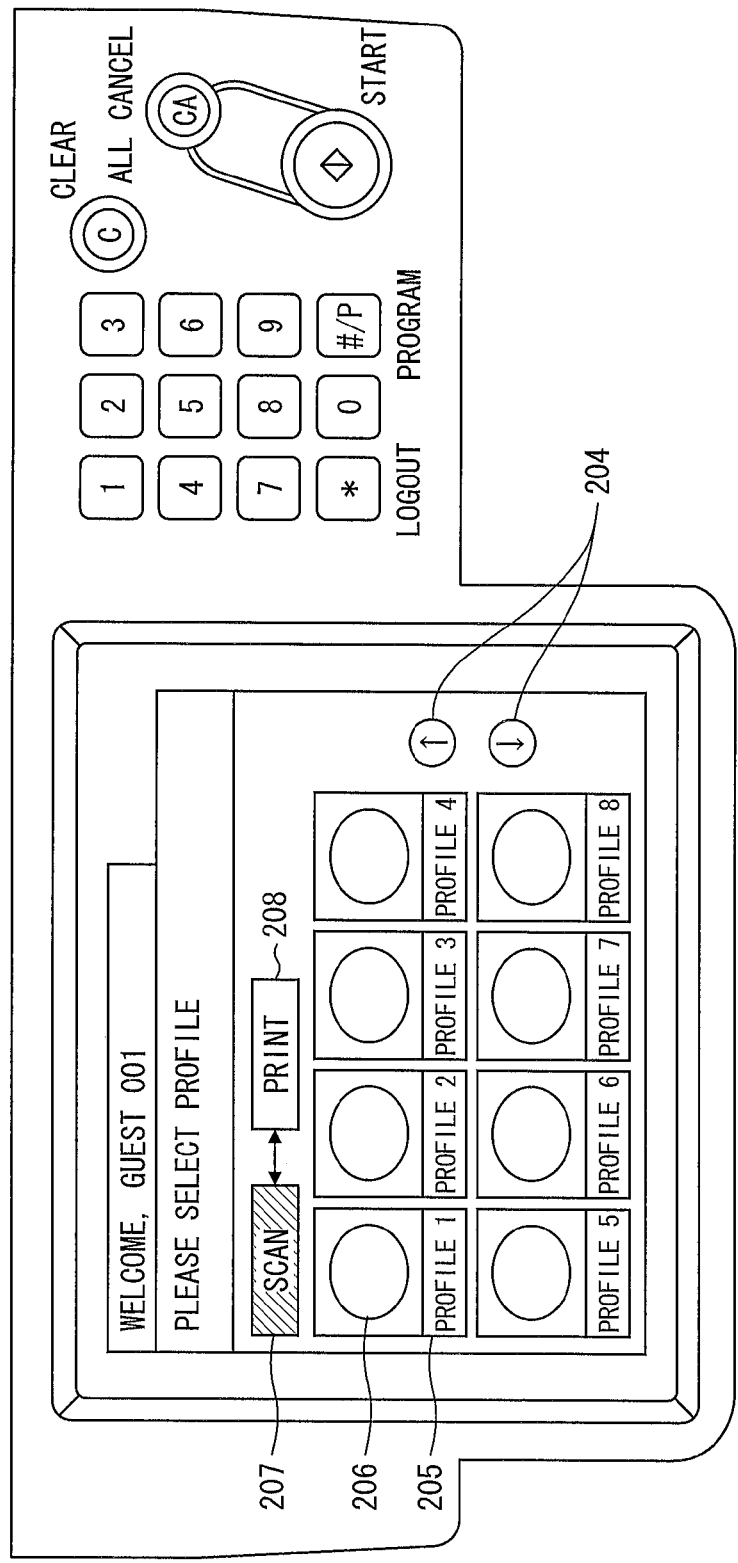
FIG. 25 is an explanatory view illustrating a profile list screen to be displayed in S27 of FIG. 21.

FIG. 24 is an explanatory view illustrating a login screen to be displayed in S23 of FIG. 21. FIG. 25 is an explanatory view illustrating a profile list screen to be displayed in S27 of FIG. 21. FIG. 26 is an explanatory view illustrating a profile details displaying screen to be displayed in S31 of FIG. 21. FIG. 27 is an explanatory view illustrating a profile saving confirmation screen to be displayed in S43 of FIG. 22.

The multifunction peripheral 5 controls the display device 55 to display the login screen of FIG. 24, when a user pushes a predetermined button for logging into the image processing system while the display device 55 of the multifunction peripheral 5 is displaying a home screen.

In response to the user pushing the predetermined button for the login, the control device 51 of the multifunction peripheral 5 requests, via the communication device 53 and the network 6, the first host PC 1 to transmit data for displaying the login screen (S21).

The control device 11 of the first host PC 1 receives a request for the data for displaying the login screen from the multifunction peripheral 5 via the network 6 and the communication device 13. In response to the request, the control device 11 of the first host PC 1 transmits the data for displaying the login screen to the multifunction peripheral 5 via the communication device 13 and the network 6 (S22).

Upon receipt of the data for displaying the login screen from the first host PC 1 via the network 6 and the communication device 53, the control device 51 of the multifunction peripheral 5 controls the display device 55 to display the login screen of FIG. 24 (S23).

When the user (i) specifies, via the input device 54, a user name and a password on the login screen displayed by the display device 55 and then (ii) pushes a LOGIN button 203 (S24), the first host PC 1 conducts an authentication process in which whether or not a password corresponding to the specified user name has been entered is authenticated (S35). In a case where it is authenticated that the password corresponding to the specified user name has been entered, the control device 51 of the multifunction peripheral 5 requests, via the communication device 53 and the network 6, the first host PC 1 to transmit data for displaying a profile list screen (S25).

The control device 11 of the first host PC 1 receives a request for the data for displaying the profile list screen, via the network 6 and the communication device 13. In response to the request, the control device 11 of the first host PC 1 transmits, to the multifunction peripheral 5 via the communication device 13 and the network 6, the data for displaying the profile list screen including a list of profiles corresponding to a user identifier of the user name specified by the user (S26).

Upon receipt of the data for displaying the profile list screen via the network 6 and the communication device 53, the control device 51 of the multifunction peripheral 5 controls the display device 55 to display the profile list screen of FIG. 25 (S27).

When the user selects, via the input device 54, a profile on the profile list screen displayed by the display device 55 (S28), the control device 51 of the multifunction peripheral 5 requests, via the communication device 53 and the network 6, the first host PC 1 to transmit data for displaying a profile details displaying screen of the profile selected by the user (S29).

The control device 11 of the first host PC 1 receives a request for the data for displaying the profile details displaying screen, via the network 6 and the communication device 13. In response to the request, the control device 11 of the first host PC 1 transmits, to the multifunction peripheral 5 via the communication device 13 and the network 6, the data for displaying the profile details displaying screen, the data including profile information corresponding to a profile identifier of the profile selected by the user (S30).

Upon receipt of the data for displaying the profile details displaying screen via the network 6 and the communication device 53, the control device 51 of the multifunction peripheral 5 controls the display device 55 to display the profile details displaying screen illustrated in FIG. 26 (S31).

Subsequently, if necessary, the user (i) changes, on the profile details displaying screen displayed by the display device 55, a scanning condition and/or a printing condition via the input device 54, and then (ii) pushes an EXCUTION button 209 (see S41 of FIG. 22). Note that FIG. 26 illustrates an example in which the scanning condition is displayed on the profile details displaying screen.

Subsequently, the control device 51 determines whether or not the scanning condition and/or the printing condition have/ has been changed (S42). In a case where the control device 51 determines that neither the scanning condition nor the printing condition has been changed, the multifunction peripheral 5 proceeds to S66 (see FIG. 23). In contrast, in a case where the control device 51 determines that at least one of the scanning condition and the printing condition has been changed, the multifunction peripheral 5 proceeds to S43.

In a case where the control device 51 determines in S42 that at least one of the scanning condition and the printing condition has been changed, the control device 51 of the multifunction peripheral 5 controls the display device 55 to display the profile saving confirmation screen illustrated in FIG. 27 (S43).

When the user pushes one of a NO button 210, an OVERWRITING SAVE button 211 and a NEWLY SAVING button 212 on the profile saving confirmation screen displayed by the display device 55, the control device 51 determines which button has been pushed (S44). In a case where the control device 51 determines that the NO button 210 has been pushed, the multifunction peripheral 5 proceeds to S66 (see FIG. 23). In a case where the control device 51 determines that the OVERWRITING SAVE button 211 has been pushed, the multifunction peripheral 5 proceeds to S46. In a case where the control device 51 determines that the NEWLY SAVING button 212 has been pushed, the multifunction peripheral 5 proceeds to S45.

When the control device 51 of the multifunction peripheral 5 determines in S44 that the NEWLY SAVING button 212 has been pushed, the control device 51 of the multifunction peripheral 5 controls the display device 55 to display a screen which urges the user to enter a new profile name. When the user enters the new profile name via the input device 54 in response to the urging, the new profile name is used as the name of a changed profile (S45).

Subsequently, the control device 51 of the multifunction peripheral 5 transmits information on the changed profile to the first host PC 1 via the communication device 53 and the network 6 (S46).

The control device 11 of the first host PC 1 receives the information on the changed profile via the network 6 and the communication device 13 (S47). Upon receipt of the information on the changed profile, the control device 11 of the first host PC 1 (i) controls the storage device 12 to store the information on the changed profile (S48) and (ii) transmits the information on the changed profile to the first client PC 3 via the communication device 13 and the network 6 (S49).

Upon receipt of the information on the changed profile via the network 6 and the communication device 13 (S50), the control device 31 of the first client PC 3 controls the storage device 32 to store the information on the changed profile (see S61 of FIG. 23).

Subsequently, the control device 31 of the first client PC 3 notifies the first host PC 1, via the communication device 33 and the network 6, that the information on the changed profile has been stored (S62).

The control device 11 of the first host PC 1 is notified, via the network 6 and the communication device 13, that the information on the changed profile has been stored (S63). The control device 11 of the first host PC 1 further notifies the multifunction peripheral 5, via the communication device 13 and the network 6, that the information on the changed profile has been stored (S64).

S64 causes the control device 51 of the multifunction peripheral 5 to be notified, via the network 6 and the communication device 53, that the information on the changed profile has been stored (S65).

The control device 51 of the multifunction peripheral 5 controls the image reading device 37 to scan under the scanning condition of the profile selected by the user, which scanning condition has been determined in S41 of FIG. 22 (S66). The control device 51 of the multifunction peripheral 5 further transmits, to the first host PC 1 via the communication device 33 and the network 6, an image scanned by the image reading device 57, i.e., a scanned image (S67).

The control device 11 of the first host PC 1 receives the scanned image via the network 6 and the communication device 13 (S68). Upon reception of the scanned image, the control device 11 of the first host PC 1 transmits the scanned image to the first client PC 3 via the communication device 13 and the network 6 (S69).

The control device 31 of the first client PC 3 receives the scanned image via the network 6 and the communication device 13. Upon receipt of the scanned image, the control device 31 of the first client PC 3 conducts a process (PC process) under a condition of the profile selected by the user, the condition having been determined in S41 of FIG. 22 (S70), and then controls the storage device 32 to store the scanned image that has been subjected to the process (PC process) (S71).

Note that the multifunction peripheral 5 controls the display device 55 to (i) initially display the home screen in response to the multifunction peripheral 5 being turned on and then (ii) display the login screen of FIG. 24 in response to a user pushing the predetermined button for logging into the image processing system. Note also that the predetermined button is a button which has been assigned to the image processing system by, e.g., pre-registration of the button. The login screen displays (i) user names 201 of respective users registered on the first host PC 1 and (ii) user icons 202 indicative of the respective users. Note that user names 201 and user icons 202 that are not displayed on the login screen of FIG. 24 can be displayed by pushing an up arrow scroll button 204 or a down arrow scroll button 204.

When (i) a user of the multifunction peripheral 5 correctly specifies a user name and a password on the login screen and then (ii) pushes the LOGIN button 203, a profile list screen related to a specified user is displayed as illustrated in FIG. 25. Note that, in a case of the profile list screen of FIG. 25, a scanning selection button 207 is highlighted by having been pushed. In other words, a scan profile indicative of a scanning condition under which the image reading device 137 of the multifunction peripheral 5 scans is selected on the profile list screen of FIG. 25.

Note also that, in the present embodiment, the user of the multifunction peripheral 5 is basically a user of the first client PC 3 (or the second client PC 4). The user of the multifunction peripheral 5 can be identified as the user of the first client PC 3 (or the second client PC 4) by successful logging of the user of the first client PC 3 (or the second client PC 4) into the multifunction peripheral 5 on the login screen of FIG. 24.

The profile list screen of FIG. 25 displays (i) profile names 205 of profiles correlated with the user name specified on the login screen of FIG. 24 and (ii) profile icons 206 indicative of the respective profiles. The profile list screen of FIG. 25 also displays (a) the scanning selection button 207 for selecting a scanning mode and (b) a printing selection button 208 for selecting a printing mode. Specifically, a user can select, on the profile list screen of FIG. 25, (i) the scan profile or a print profile and (ii) one of a plurality of pre-registered profiles (e.g., profiles 1 through 8) for each of the scan profile and the print profile.

When the user selects a target profile on the profile list screen of FIG. 25, the profile details displaying screen of the target profile (a screen which displays details of information on conditions under which a process is conducted) is displayed (see FIG. 26). The profile details displaying screen illustrated in FIG. 26 displays a scanning condition of, a printing condition of, or a PC processing condition (information on conditions under which an additional process is conducted) of the profile selected on the profile list screen of FIG. 25. FIG. 26 illustrates an example of the profile details displaying screen which is displayed in a case where, on the profile list screen of FIG. 25, (i) the scan profile has been selected and (ii) one of, for example, the profiles 1 through 8 has been selected. The user of the multifunction peripheral 5 can confirm and/or change, on the profile details displaying screen illustrated in FIG. 26, the scanning condition, the printing condition, and the PC processing condition (e.g., conditions under which the first client PC 3 conducts a process) of the multifunction peripheral 5.

A scanning or printing operation is conducted, when the user pushes the EXECUTION button 209 on the profile details displaying screen illustrated in FIG. 26, without having changed any of the scanning condition, the printing condition, and the PC processing condition on the profile details displaying screen illustrated in FIG. 26. In contrast, the profile saving confirmation screen of FIG. 27 is displayed, when the user pushes the EXECUTION button 209 after having changed at least one of the scanning condition, the printing condition, and the PC processing condition on the profile details displaying screen illustrated in FIG. 26.

When the user pushes the NO button 210 on the profile saving confirmation screen, the scanning or printing operation is conducted. When the user pushes the OVERWRITING SAVE button 211, changed results are reflected in a corresponding profile stored in each of the storage device 32 of the first client PC 3 and the storage device 12 of the first host PC 1. When the user pushes the NEWLY SAVING button 212, changed results are stored as a new profile in each of the storage device 32 of the first client PC 3 and the storage device 12 of the first host PC 1.

According to the image processing system of the present embodiment, the multifunction peripheral 5 thus creates, edits, and deletes the scan profile and the print profile, in response to an operation conducted by a user. The scan profile and the print profile which have been created or edited by the multifunction peripheral 5 are transmitted from the multifunction peripheral 5 to the first host PC 1. The first host PC 1, in turn, transmits the scan profile and the print profile to the first client PC 3. This causes the first host PC 1 and the first client PC 3 to store the scan profile and the print profile.

The profile information (see FIG. 4) and the user information (see FIG. 5) are created by the first client PC 3 or the first host PC 1 by use of a profile received from the multifunction peripheral 5, and are then stored in the first client PC 3 and the first host PC 1.

In a case where the first client PC 3 is connected to the first host PC 1 in the image processing system, the profile information and the user information of the first client PC 3 are transmitted to the first host PC 1 and stored in the first host PC 1 (see FIG. 8). Therefore, in a case where the first client PC 3 is disconnected from a first image processing system so as to be connected to a second image processing system, the profile information and the user information of the first client PC 3 are stored in a first host PC 1 of the second image processing system.

Even in a case where the first client PC 3 is disconnected from the first image processing system so as to be connected to the first host PC 1 of the second image processing system, it is possible to use a profile that has been stored in the first image processing system even in the second image processing system. This allows the second image processing system to swiftly conduct scanning and printing operations by use of (i) an existing scan profile in which a scanning condition has been determined and (ii) an existing print profile in which a printing condition has been determined.

Note that, in the image processing system of the present embodiment, a scan profile can contain, in addition to a scan setting condition, a PC processing condition under which a scanned image scanned by the image reading device 137 of the multifunction peripheral 5 is processed. Similarly, a print profile can contain, in addition to a print setting condition, a PC processing condition under which print data to be transmitted from the first client PC 3 or the first host PC 1 to the multifunction peripheral 5 is processed.

The first client PC 3 or the first host PC 1 conducts the process with respect to the scanned image under the PC processing condition. The first client PC 3 or the first host PC 1 also conducts the process with respect to the print data under the PC processing condition. Therefore, at least one of the first client PC 3 and the first host PC 1 has a function of conducting, with respect to the scanned image, a process in accordance with the PC processing condition. At least one of the first client PC 3 and the first host PC 1 also has a function of conducting, with respect to the print data, a process in accordance with the PC processing condition. FIG. 23 illustrates an example of how the first client PC 3 conducts a process under a PC processing condition.

FIG. 28 is an explanatory view schematically illustrating a data structure of information on a PC processing condition contained in profile information. As illustrated in FIG. 28, whether to conduct each of processes, such as (i) image skew correction, (ii) character recognition (OCR), (iii) image high compression (a process of reducing the size of an image file), and (iv) startup of an external application, is determined in the PC processing condition. Further, the PC processing condition contains input parameters for the respective processes to be conducted. At least one of the control device 31 of the first client PC 3 and the control device 121 of the first host PC 1 has a function of conducting the processes determined in the PC processing condition.

Figure 29:
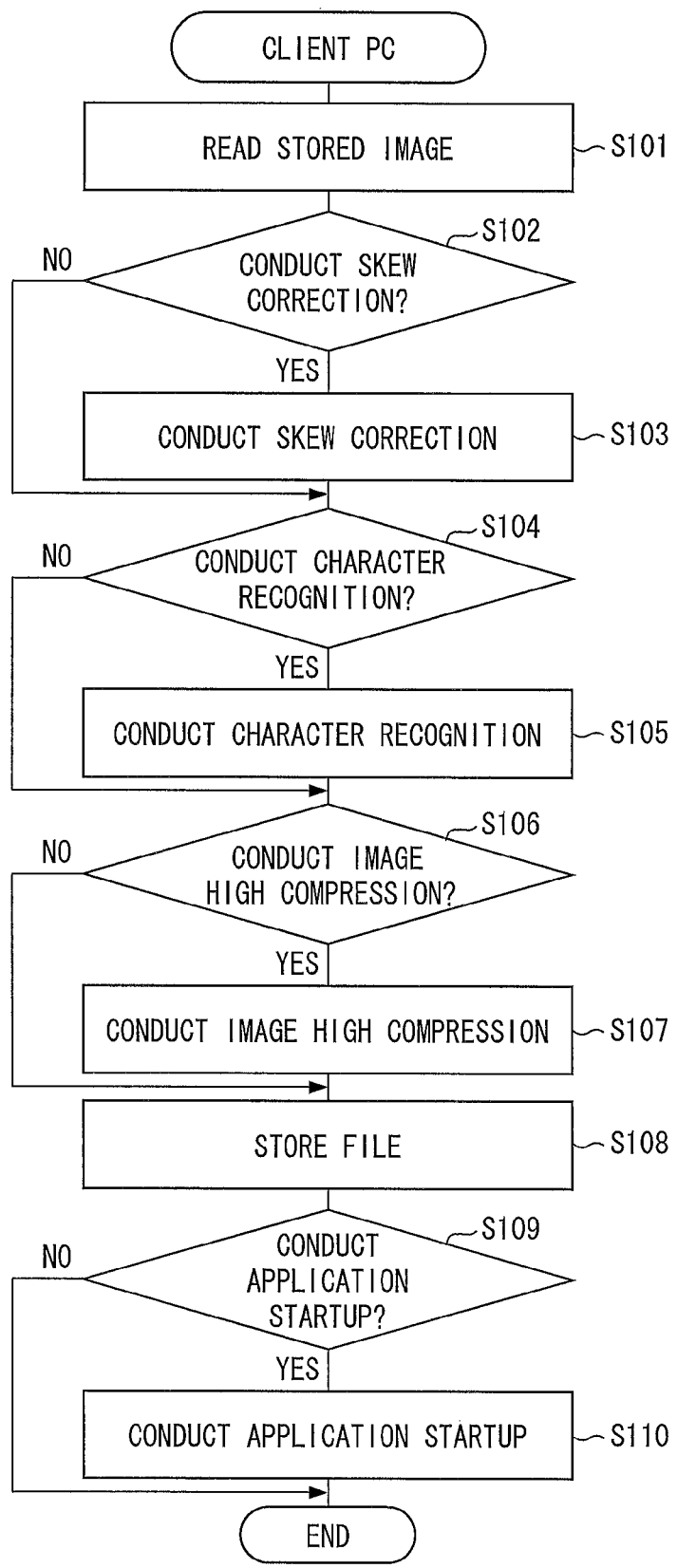
FIG. 29 is a flowchart illustrating a PC process conducted by the first client PC illustrated in FIG. 1.

FIG. 29 is a flowchart illustrating a PC process conducted by the first client PC 3 in a case where a profile, selected by a user from the profile list screen of FIG. 25, contains a PC processing condition. The PC process is automatically conducted in the image processing system after operations conducted during a period of time from the start of the login operation (see FIG. 21) to the end of the scanning operation (see FIG. 23).

As illustrated in FIG. 29, the control device 11 of the first client PC 1 reads out, from the storage device 12, a scanned image to be processed, in a case where the PC process is conducted under the PC processing condition contained in the profile (S101).

In a case where a skew correction is set, in the PC processing condition, to be conducted (S102), the control device 31 conducts the skew correction in accordance with a skew correction parameter indicated in the PC processing condition (S103).

In a case where a character recognition is set, in the PC processing condition, to be conducted (S104), the control device 31 conducts the character recognition in accordance with a character recognition parameter indicated in the PC processing condition (S105).

In a case where an image high compression is set, in the PC processing condition, to be conducted (S106), the control device 31 conducts the image high compression in accordance with an image high compression parameter indicated in the PC processing condition (S107).

The storage device 32 stores a file (scanned image data) which has been created by having been subjected to S103, S105 and S107 (S108).

In a case where the other application program is set, in the PC processing condition, to start up (S109), the control device 31 controls the other application program to start up in accordance with an application startup parameter (S110).

According to the image processing system of the present embodiment, a profile also contains a PC processing condition under which, for example, the first client PC 3 conducts a process. This allows the image processing system of the present embodiment to conduct a more advanced process.

Note that the image processing system of the present embodiment can be configured so that a plurality of multifunction peripherals 5, each of which serves as an image processing apparatus, are connected via the network 6 to the first host PC 1, the second host PC 2, the first client PC 3, and the second client PC 4. The image processing system of the present embodiment can be further configured so that the order, in which profile icons are arranged and displayed on a display device 55 provided in an operation panel, is changed for each of the plurality of multifunction peripherals 5.

The configuration allows a user to determine the order, in which the icons are arranged, subject to availability, so as to be most easy to use the multifunction peripheral 5. For example, in a case where a user uses a multifunction peripheral 5 which has a high-resolution and can carry out high-speed scanning, the user can determine the order, in which profile icons are arranged, so that an icon assigned to a high-resolution reading profile is displayed and ranks higher. Alternatively, in a case where a user uses a multifunction peripheral 5 which can carry out a high-resolution scan only at low speed, the user can determine the order, in which icons are arranged, so that an icon assigned to a low-resolution reading profile is displayed and ranks higher.

The following description will discuss how the image processing system operates in a case where a display device 55 of a multifunction peripheral 5 displays as above.

In S25 through S27 of FIG. 21, the multifunction peripheral 5 receives, from the first host PC 1, data for displaying a profile list screen. Note that the first host PC 1 is configured, at a timing when a request for transmitting the data for displaying the profile list screen is requested in S25, to (i) receive, from the multifunction peripheral 5, identification information (such as an IP address, a model name and/or a serial number) of the multifunction peripheral 5 and (ii) detect, on the basis of the identification information, which multifunction peripheral 5 has transmitted such a request to the first host PC 1. The first host PC 1 is further configured to detect, through a user login process (in S24 and S35) which has been already conducted before S25, which user uses the multifunction peripheral 5.

The first host PC 1 refers to a management table (see FIG. 30) while employing a user identifier and multifunction peripheral identification information as key information so as to obtain information on the order in which profile icons are arranged. FIG. 30 shows the management table which stores (i) icon IDs of respective profile icons for each multifunction peripheral 5 and (ii) the order in which the icon IDs are arranged. Note that the management table is stored in the storage device 12 of the first host PC 1. The management table is stored, in advance by a user or a manager, in the storage device 12 of the first host PC 1.

Subsequently, the first host PC 1 (i) changes an image of a profile list in accordance with the information on the order in which the profile icons are arranged, which information has been obtained with reference to the management table and then (ii) transmits data for changed image of the profile list to a corresponding multifunction peripheral.

Alternatively, for example, the first client PC 3 can be configured to (i) store, in the storage device 32, the management table which has been edited in the first client PC 3 by a user and (ii) transmit the management table to, for example, the first host PC 1 when being connected to the first host PC 1.

Note that the present embodiment has described the configuration in which a single client PC, a single first host PC 1, and a single multifunction peripheral 5 are connected with one another via the network 6 in the image processing system. However, the configuration of the image processing system is not limited to this. Alternatively, the image processing system can be configured so that a plurality of client PCs, a plurality of first host PCs 1, and a plurality of multifunction peripherals 5 are connected with one another. For example, the image processing system can be configured so that a plurality of client PCs, a single first host PC 1, and a plurality of multifunction peripherals 5 are connected to one another via the network 6. With the configuration, combinations, in each of which a corresponding one of the plurality of first client PCs 3 and a corresponding one of the plurality of multifunction peripherals 5 are combined, simultaneously conduct the operations illustrated in FIGS. 13 through 15.

Alternatively, the image processing system can be configured so that a first function of a multifunction peripheral 5, which first function can be used by a first client PC 3 that is to be temporarily connected to the multifunction peripheral 5, is limited, as compared with a second function of the multifunction peripheral 5, which second function can be used by a normal first client PC 3. Examples of such a limitation of functions encompass a case where a printing function of the multifunction peripheral 5 that can print in full color is limited to merely monochrome printing.

Note that the first function of the multifunction peripheral 5, which first function can be used by the first client PC 3 that is to be temporarily connected to the multifunction peripheral 5, can be limited by a first host PC 1, the multifunction peripheral 5 or an account managing server 104.

Finally, each of the first host PC 1, the second host PC 2, the first client PC 3, the second client PC 4, and the multifunction peripheral 5 in the image processing system can be implemented by hardware logic or can be alternatively implemented by software with the use of a CPU (Central Processing Unit).

In the latter case, each of the first host PC 1, the second host PC 2, the first client PC 3, the second client PC 4, and the multifunction peripheral 5 includes: a CPU that executes instructions of a program which realizes the foregoing functions; a ROM (read only memory) storing the program; a RAM (random access memory) in which the program is loaded; and a storage device (storage medium), such as a memory, which stores the program and various kinds of data. The object of the present invention can be achieved, by supplying, to the first host PC 1, the second host PC 2, the first client PC 3, the second client PC 4, and the multifunction peripheral 5, a computer-readable storage medium storing control program codes (executable program, intermediate code program or source program) for the first host PC 1, the second host PC 2, the first client PC 3, the second client PC 4, and the multifunction peripheral 5, each of which serves as software for realizing the foregoing functions, so that the computer (or CPU or MPU) retrieves and executes the program code stored in the storage medium.

Examples of the storage medium include: a tape, such as a magnetic tape or a cassette tape; a disk including (i) a magnetic disk such as a floppy (Registered Trademark) disk or a hard disk and (ii) an optical disk such as CD-ROM, MO, MD, DVD or CD-R; a card such as an IC card (memory card) or an optical card; and a semiconductor memory such as a mask ROM, EPROM, EEPROM (Registered Trademark) or flash ROM.

Further, the first host PC 1, the second host PC 2, the first client PC 3, the second client PC 4, and the multifunction peripheral 5 can be arranged to be connectable to a communications network so that the control program codes may be made available to the first host PC 1, the second host PC 2, the first client PC 3, the second client PC 4, and the multifunction peripheral 5 via the communications network. The communications network is not limited to a specific one. Examples of the communications network include the Internet, an intranet, extranet, LAN, ISDN, VAN, CATV communications network, virtual dedicated network (virtual private network), telephone line network, mobile communications network, and satellite communications network. The transfer medium which constitutes the communications network is not limited to a specific one. Examples of the transfer medium include: wired line such as IEEE 1394, USB, electric power line, cable TV line, telephone line or ADSL; and wireless such as infrared radiation (IrDA, remote control), Bluetooth (Registered Trademark), 802.11 wireless, HDR, mobile telephone network, satellite line or terrestrial digital network. The present invention can also be implemented by the control program code in the form of a computer data signal embedded in a carrier wave which is embodied by electronic transmission.

An image processing system of the present invention is configured to include: a client device; a host device; and an image processing apparatus, an icon, associated with operation setting information, being registered on the image processing apparatus, a display device of the image processing apparatus displaying the icon in response to a request to display the icon, and the image processing apparatus operating in accordance with an operation condition indicated by operation setting information associated with a selected icon, the client device including a storage device and a control section, the control section of the client device controlling (i) the storage device of the client device to store a first icon registered on the client device and (ii) the first icon to be transmitted to the host device, the host device including a storage device and a control section, and the control section of the host device controlling (i) the storage device of the host device to store the first icon received from the client device and (ii) the first icon to be registered on the image processing apparatus.

The image processing system can be configured so that the control section of the host device controls (i) the storage device of the host device to store a second icon registered on the host device, (ii) the second icon to be registered on the image processing apparatus, and (iii) the second icon to be transmitted to the client device, the client device includes a display device, the control section of the client device controls (i) the storage device of the client device to store the second icon received from the host device and (ii) the display device of the client device to display the second icon stored in the storage device of the client device in response to a request to display the second icon.

According to the configuration, the control section of the host device controls (i) the storage device of the host device to store the second icon registered on the host device and (ii) the second icon to be registered on the image processing apparatus. Further, the control section of the host device transmits, to the client device, the second icon stored in the storage device of the host device. The control section of the client device controls the storage device of the client device to store the second icon received from the host device. In response to the request to display the second icon, the control section of the client device controls the display device of the client device to display the second icon stored in the storage device of the client device.

Therefore, a user can use as appropriate the second icon registered on the host device. By using an available icon registered on the host device, a user can do without conducting an operation of registering the icon on a client device.

The image processing system can be configured so that the control section of the host device controls the second icon registered on the host device to be transmitted to all client devices which are being connected to the host device.

According to the configuration, a user(s) of the all client devices can use the second icon registered on the host device for each of the all client devices that are being connected to the host device. By using an available icon registered on the host device, a user can do without conducting an operation of registering the icon on each of the all client devices.

The image processing system can be configured so that, upon disconnection of the client device from the host device, the control section of the client device controls the storage device of the client device to delete all the second icon which has been received from the host device.

According to the configuration, upon disconnection of the client device from the host device, all the second icon which has been received from the host device is deleted from the storage device of the client device. Therefore, in a case where the client device is disconnected from a first host device and then connected to a second host device, it is possible to prevent (i) an unnecessary icon received from the first host device and (ii) a necessary icon received from the second host device from coexisting in the storage device of the client device. This makes it possible to easily use the necessary icon received from the second host device.

The image processing system can be configured so that, upon disconnection of the client device from the host device, the control section of the host device controls the storage device of the host device to delete all the first icon which has been received from the client device.

According to the configuration, upon disconnection of the client device from the host device, the first icon which has been received from the client device is deleted from the storage device of the host device. This prevents storage capacity of the storage device of the host device from being filled with an unnecessary icon accumulated in the storage device of the host device.

The image processing system can be configured so that the control section of the client device controls the storage device of the client device to store the first icon (i) which is registered on the client device together with entering of user information and (ii) to which user identification information is added, and in response to a request to display the first icon which request is made together with the entering of the user information, the control section of the client device controls the display device of the client device to display only the first icon (i) which is stored in the storage device of the client device and (ii) to which the user identification information corresponding to the user information which is entered when the request is made is added.

According to the configuration, in response to a request to display the first icon which request is made together with the entering of the user information, the display device of the client device displays only the first icon (i) which is stored in the storage device of the client device and (ii) to which the user identification information corresponding to the user information which is entered when the request is made is added. Therefore, in a case where a plurality of users use a single client device, it is possible to prevent an icon registered by one of the users from being browsed by the other(s) of the users on a display device of the single client device.

The present invention is not limited to the description of the embodiment above, and can therefore be modified by a skilled person in the art within the scope of the claims. Namely, an embodiment derived from a proper combination of technical means disclosed in different embodiments is encompassed in the technical scope of the present invention.

REFERENCE SIGNS LIST

1: First host PC (host device)
2: Second host PC (host device)
3: First client PC (client device)
4: Second client PC (client device)
5: Multifunction peripheral (image processing apparatus)
11 and 21: Control device (control section of host device)
31 and 41: Control device (control section of client device)
12 and 22: Storage device (storage device of host device)
32 and 42: Storage device (storage device of client device)
35 and 45: Display device (display device of client device)
55: Display device (display device of image processing apparatus)
201: User name
202: User icon
205: Profile name
206: Profile icon
207: Scanning selection button
208: Printing selection button
301: ADD button
302: EDIT button
303: DELETE button

The invention claimed is:

1. An image processing system, comprising:
a client device;
a host device; and
an image processing apparatus,
an icon, associated with operation setting information, being registered on the image processing apparatus, a display device of the image processing apparatus displaying the icon in response to a request to display the icon, and the image processing apparatus operating in accordance with an operation condition indicated by operation setting information associated with a selected icon,
the client device including a storage device and a control section,
the control section of the client device controlling (i) the storage device of the client device to store a first icon registered on the client device and (ii) only a third icon to be transmitted to the host device, the third icon being included in the first icon stored in the storage device of the client device and being registered on the client device through an entering operation which is carried out with respect to the client device by a user of the client device,
the host device including a storage device and a control section,
the control section of the host device controlling (i) the storage device of the host device to store the third icon received from the client device and (ii) the third icon to be registered on the image processing apparatus,
the control section of the host device controlling (i) the storage device of the host device to store a second icon registered on the host device and (ii) only a fourth icon to be registered on the image processing apparatus and to be transmitted to the client device, the fourth icon being included in the second icon stored in the storage device of the host device and being registered on the host device through an entering operation which is carried out with respect to the host device by a user of the host device, the client device including a display device, and the control section of the client device controlling (i) the storage device of the client device to store the fourth icon received from the host device and (ii) the display device of the client device to display the third icon and the fourth icon which are stored in the storage device of the client device in response to a request to display the third icon and the fourth icon.

2. The image processing system as set forth in claim 1, wherein the control section of the host device controls only the fourth icon to be transmitted to all client devices which are being connected to the host device, the fourth icon being included in the second icon stored in the storage device of the host device and being registered on the host device through the entering operation which is carried out with respect to the host device by the user of the host device.

3. The image processing system as set forth in claim 1, wherein, upon disconnection of the client device from the host device, the control section of the client device controls the storage device of the client device to delete all the fourth icon which has been received from the host device.

4. The image processing system as set forth in claim 1, wherein, upon disconnection of the client device from the host device, the control section of the host device controls the storage device of the host device to delete all the third icon which has been received from the client device.

5. The image processing system as set forth in claim 1, wherein the control section of the client device controls the storage device of the client device to store a fifth icon (i) which is registered on the client device together with entering of user information and (ii) to which user identification information is added, and in response to a request to display the fifth icon which request is made together with the entering of the user information, the control section of the client device controls the display device of the client device to display only the fifth icon (i) which is included in the first icon stored in the storage device of the client device and (ii) to which the user identification information corresponding to the user information which is entered when the request is made is added.

6. An image processing method, in which an icon associated with operation setting information is registered on an image processing apparatus, a display device of the image processing apparatus displays the icon in response to a request to display the icon, and the image processing apparatus operates in accordance with an operation condition indicated by operation setting information associated with a selected icon, the image processing method comprising the steps of:

causing a storage device of a client device to store a first icon registered on the client device, and transmitting, to a host device, only a third icon which is (i) included in the first icon stored in the storage device of the client device and (ii) registered on the client device through an entering operation which is carried out with respect to the client device by a user of the client device;

causing a storage device of the host device to store the third icon received from the client device, and causing the third icon to be registered on the image processing apparatus;

causing the storage device of the host device to store a second icon registered on the host device, and causing only a fourth icon to be registered on the image processing apparatus and to be transmitted to the client device, the fourth icon being included in the second icon stored in the storage device of the host device and being registered on the host device through an entering operation which is carried out with respect to the host device by a user of the host device; and causing the storage device of the client device to store the fourth icon received from the host device, and causing a display device of the client device to display the third icon and the fourth icon which are stored in the storage device of the client device in response to a request to display the third icon and the fourth icon.

7. A non-transitory computer-readable storage medium including a program for causing the image processing system recited in claim 1 to function, the program including (i) a program configured to cause a computer to function as the control section of the client device and (ii) a program configured to cause the computer to function as the control section of the host device.

\* \* \* \* \*